US012670227B2

(12) United States Patent
Liu et al.

(10) Patent No.: US 12,670,227 B2
(45) Date of Patent: Jun. 30, 2026

(54) METHODS AND DEVICES FOR EFFICIENT GENERAL DECONVOLUTION IMPLEMENTATION ON HARDWARE ACCELERATOR

(71) Applicant: KWAI INC., Palo Alto, CA (US)

(72) Inventors: Shiya Liu, Blacksburg, VA (US); Ming Kai Hsu, Fremont, CA (US); Quan Lin, San Jose, CA (US); Lingzhi Liu, San Jose, CA (US)

(73) Assignee: BEIJING TRANSTREAMS TECHNOLOGY CO. LTD., Beijing (CN)

( * ) Notice: Subject to any disclaimer, the term of this patent is extended or adjusted under 35 U.S.C. 154(b) by 906 days.

(21) Appl. No.: 17/468,507

(22) Filed: Sep. 7, 2021

(65) Prior Publication Data

US 2023/0075264 A1 Mar. 9, 2023

(51) Int. Cl.
G06F 17/15 (2006.01)

(52) U.S. Cl.
CPC .................................. G06F 17/153 (2013.01)

(58) Field of Classification Search
CPC ....... G06F 17/15; G06F 17/153; G06F 17/156
See application file for complete search history.

(56) References Cited

U.S. PATENT DOCUMENTS

| | | | | |
|---|---|---|---|---|
| 11,301,546 B2 * | 4/2022 | Ross | | G06F 9/544 |
| 11,854,241 B2 * | 12/2023 | Jang | | G06V 10/454 |
| 12,306,901 B2 * | 5/2025 | Liu | | G06F 7/5443 |
| 2018/0032857 A1 * | 2/2018 | Lele | | G06N 3/0464 |
| 2019/0138898 A1 * | 5/2019 | Song | | G06N 3/04 |
| 2019/0340498 A1 * | 11/2019 | Mills | | G06F 17/15 |
| 2020/0050937 A1 * | 2/2020 | Kurasawa | | G06N 3/08 |
| 2020/0301994 A1 * | 9/2020 | Dikici | | G06N 3/063 |
| 2020/0327078 A1 * | 10/2020 | Zhao | | G06F 13/28 |
| 2021/0326406 A1 * | 10/2021 | Wang | | G06N 3/08 |

* cited by examiner

*Primary Examiner* — James Trujillo
*Assistant Examiner* — Markus Anthony Villanueva
(74) *Attorney, Agent, or Firm* — Arch & Lake LLP; Hao Tan; Shen Wang

(57) ABSTRACT

Methods and devices are provided for implementing efficient general deconvolution Implementation on hardware accelerator. In one method for implementing a devolution operation to obtain a multi-dimensional output feature map in a pre-defined dimensional count, a multi-dimensional kernel is subsampled into a plurality of non-overlapping multi-dimensional sub-kernels, each in the pre-defined dimensional count, based on a pre-defined common stride parameter, a plurality of multi-dimensional sub-output feature maps in the pre-defined dimensional count is obtained by applying a stride-dependent virtual padded devolution operation between a multi-dimensional input map and each multi-dimensional sub-kernel in the plurality of non-overlapping multi-dimensional sub-kernels, and in response to determining the pre-defined common stride parameter is not greater than two, a pre-defined multi-dimensional interleave-concatenation method is used to interleave-concatenate and reorder the plurality of multi-dimensional sub-output feature maps into the multi-dimensional output feature map.

21 Claims, 15 Drawing Sheets

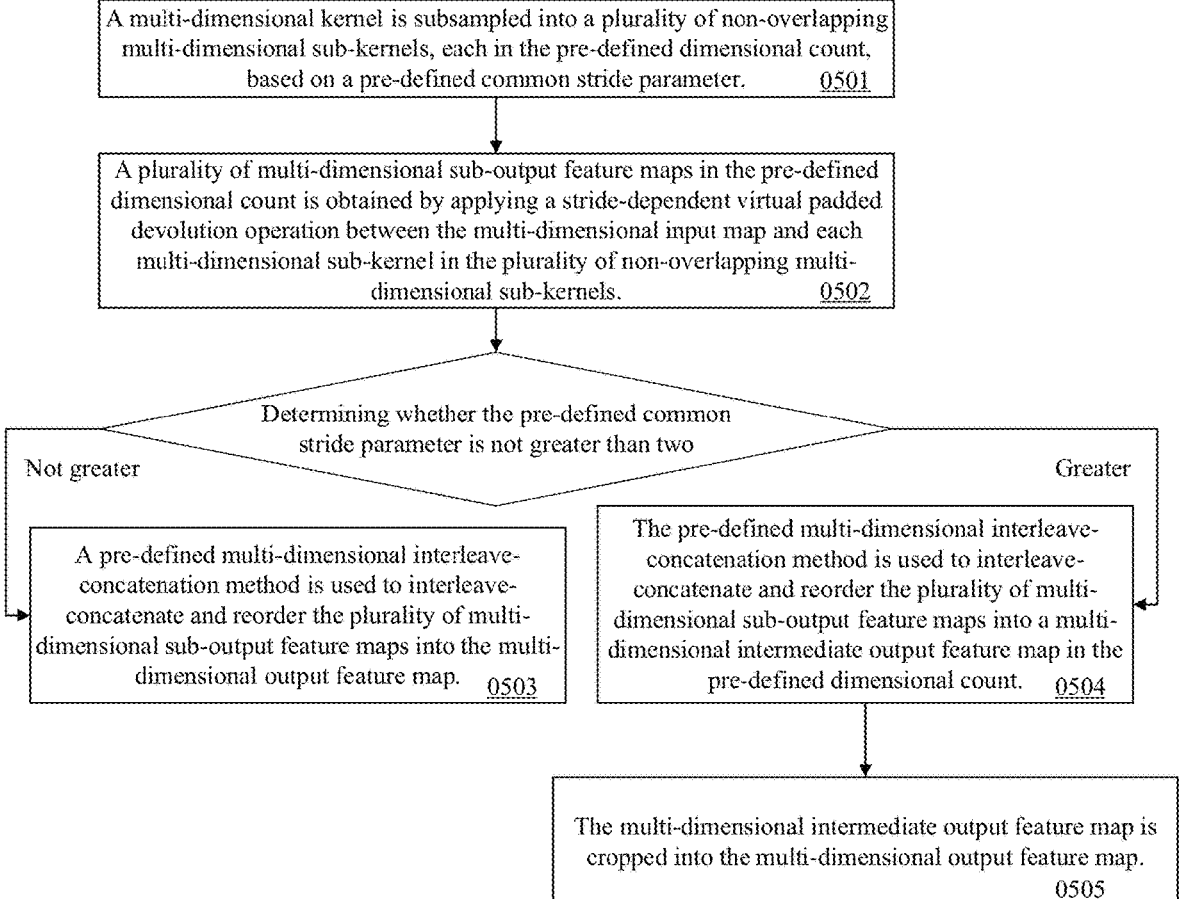

A multi-dimensional kernel is subsampled into a plurality of non-overlapping multi-dimensional sub-kernels, each in the pre-defined dimensional count, based on a pre-defined common stride parameter.        0501

A plurality of multi-dimensional sub-output feature maps in the pre-defined dimensional count is obtained by applying a stride-dependent virtual padded devolution operation between the multi-dimensional input map and each multi-dimensional sub-kernel in the plurality of non-overlapping multi-dimensional sub-kernels.        0502

Determining whether the pre-defined common stride parameter is not greater than two Not greater Greater A pre-defined multi-dimensional interleave-concatenation method is used to interleave-concatenate and reorder the plurality of multi-dimensional sub-output feature maps into the multi-dimensional output feature map.        0503

The pre-defined multi-dimensional interleave-concatenation method is used to interleave-concatenate and reorder the plurality of multi-dimensional sub-output feature maps into a multi-dimensional intermediate output feature map in the pre-defined dimensional count.        0504

The multi-dimensional intermediate output feature map is cropped into the multi-dimensional output feature map.        0505

FIG. 5

Obtain a vertical dimensional measurement of the 2-dimensional sub-kernel    1210

Subtract the vertical dimensional measurement by the number one    1220

Subtract a result of 1220 by pre-defined common vertical padding parameter    1230

Setting, to top and bottom sides of the 2-dimensional sub-kernel, a vertical padding size as equal to a result of 1230    1240

METHODS AND DEVICES FOR EFFICIENT GENERAL DECONVOLUTION IMPLEMENTATION ON HARDWARE ACCELERATOR

FIELD

The present disclosure relates generally to Artificial Intelligence (AI) chip, Neural Processing Unit (NPU), deep learning, and AI compiler. More specifically, this disclosure relates to systems and methods for implementing a devolution operation between a multi-dimensional kernel in a pre-defined dimensional count and a multi-dimensional input map in the pre-defined dimensional count to obtain a multi-dimensional output feature map in the pre-defined dimensional count.

BACKGROUND

This section provides background information related to the present disclosure. The information contained within this section should not necessarily be construed as prior art.

Convolution and deconvolution layers have been widely used in deep neural networks (DNNs) and are considered as one of the most computation-intensive layers in DNNs. Nowadays, hardware accelerators have been optimized for convolution layers but not for deconvolution layers.

The reason that no such optimized hardware accelerators for deconvolution layers are in wide use is that existing solutions either require large amount of computation/memory resources, or place strict constraints on parameters.

In one existing approach, large number of zeroes are inserted to a feature map, and convolution operations are then applied to the resulting feature map. This approach is straightforward but presents significant resource requirements.

In another existing approach, the deconvolution kernel is subdivided into several sub-kernels, which are then applied to the feature map individually. This approach requires less resource but has strict constraints on parameters.

In the present application, an efficient general deconvolution solution is presented that solution saves computation/memory resources. Moreover, this solution removes the strict constraints of existing solutions on parameters, and is a much more general implementation of deconvolution layers compared to existing solutions.

SUMMARY

This section provides a general summary of the disclosure, and is not a comprehensive disclosure of its full scope or all of its features.

According to a first aspect of the present application, a multi-dimensional kernel is subsampled into a plurality of non-overlapping multi-dimensional sub-kernels, each in the pre-defined dimensional count, based on a pre-defined common stride parameter, a plurality of multi-dimensional sub-output feature maps in the pre-defined dimensional count is obtained by applying a stride-dependent virtual padded devolution operation between the multi-dimensional input map and each multi-dimensional sub-kernel in the plurality of non-overlapping multi-dimensional sub-kernels, and in response to determining the pre-defined common stride parameter is not greater than two, a pre-defined multi-dimensional interleave-concatenation method is used to interleave-concatenate and reorder the plurality of multi-dimensional sub-output feature maps into the multi-dimensional output feature map, and further, in response to determining the pre-defined common stride parameter is greater than two, the pre-defined multi-dimensional interleave-concatenation method is used to interleave-concatenate and reorder the plurality of multi-dimensional sub-output feature maps into a multi-dimensional intermediate output feature map in the pre-defined dimensional count, and then the multi-dimensional intermediate output feature map is cropped into the multi-dimensional output feature map.

According to a second aspect of the present application, a computing device includes one or more processors, memory and a plurality of programs stored in the memory. The programs, when executed by the one or more processors, cause the computing device to perform operations as described above in the first aspect of the present application.

According to a third aspect of the present application, a non-transitory computer readable storage medium stores a plurality of programs for execution by a computing device having one or more processors. The programs, when executed by the one or more processors, cause the computing device to perform operations as described above in the first aspect of the present application.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

FIG. 5 is a flow chart illustrating the steps of the first aspect of the present application.

DETAILED DESCRIPTION

Figure 1:
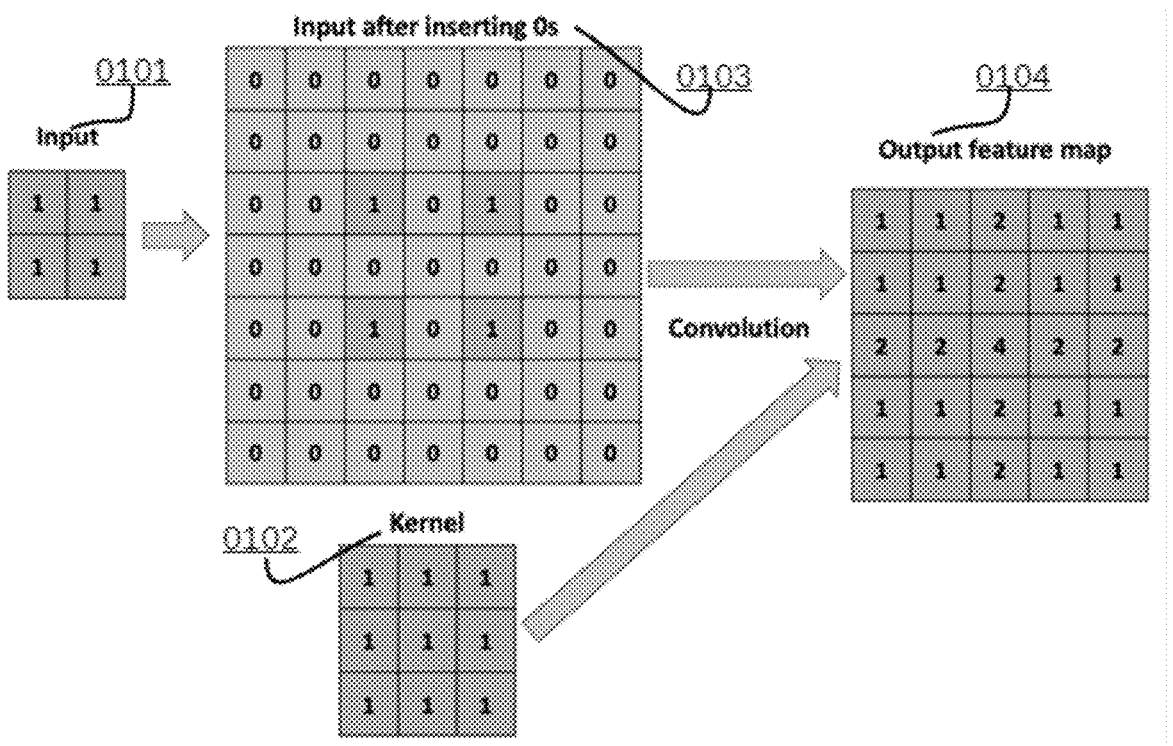
FIG. 1 is an illustration of an example of one existing approach for implementing deconvolution layers in a two-dimensional setup.

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Deconvolution layers are widely used in deep neural networks. Deconvolution layers apply a multi-dimensional kernel to a multi-dimensional input feature map to obtain a multi-dimensional output feature map. The dimensional measurements of the output feature map are determined by the dimensional measurements of the kernel, the dimensional measurements of the input feature map, a pre-defined common stride parameter, and a plurality of pre-defined common padding parameters with the plurality count equal to the pre-defined dimensional count.

By way of example, if the kernel and the input feature map are both 2-dimensional, the dimensional measurements of the input feature map are i by i, the dimensional measurements of the kernel are k by k, the stride parameter is s, and the two padding parameters (since the dimensional count is two, there are two padding parameters) are both equal to p, then the dimensional measurements of the output feature map would be $s \times (i-1) + k - 2p$ by $s \times (i-1) + k - 2p$. Such calculated dimensional measurements of the output feature map are known as the ground truth dimensional measurements of the output feature map, and any implementation of deconvolution layers must result in a perfect matching of the dimensional measurements of the output feature map to the ground truth dimensional measurements.

The common solution to implement deconvolution layers is to exploit optimized convolution layers to perform deconvolution layers. There are two popular approaches to transform a deconvolution layer into a convolution layer.

The first approach inserts zeros between pixels in the input feature map and then applies convolution operations to the resulted feature map. FIG. 1 is an illustration of an example of this approach in a two-dimensional setup. In the example illustrated in FIG. 1, the dimensional measurements of the input feature map 0101 are 2×2, and the dimensional measurements of the kernel 0102 are 3×3, the two padding parameters are both equal to 0, and the stride parameter is equal to 2. Therefore, each dimensional measurement of the output feature map would be 2×(2−1)+3−2×0=5, that is, the ground truth dimensional measurements of the output feature map would be 5×5.

As illustrated in FIG. 1, zeroes (depicted as lighter boxes) are inserted in between the pixels of the input feature map (depicted as darker boxes), and also padded around the input feature map. The kernel is then convolved with the resulting inserted-and-padded feature map 0103 to yield the 5×5 output feature map 0104.

The second approach divides the deconvolution kernel into several sub-kernels, which will be applied to the input feature map individually. Output feature maps from these sub-kernels are interleave-concatenated and reordered to form the final output feature map.

Figure 2A:
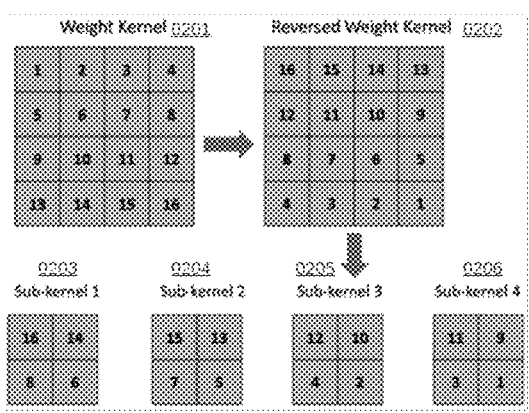
FIG. 2A is an illustration of a first step of three steps of an example of a second existing approach for implementing deconvolution layers in a two-dimensional setup, wherein the padding parameters are equal to 2.

FIG. 2A is an illustration of a first step of an example of the second approach, still in a two-dimensional setup. In this example, the dimensional measurements of the input feature map are 3×3, and the dimensional measurements of the kernel are 4×4, the two padding parameters are both equal to 2, and the stride parameter is equal to 2. Therefore, each dimensional measurement of the output feature map would be 2×(3−1)+4−2×2=4, that is, the ground truth dimensional measurements of the output feature map would be 4×4.

Figure 2B:
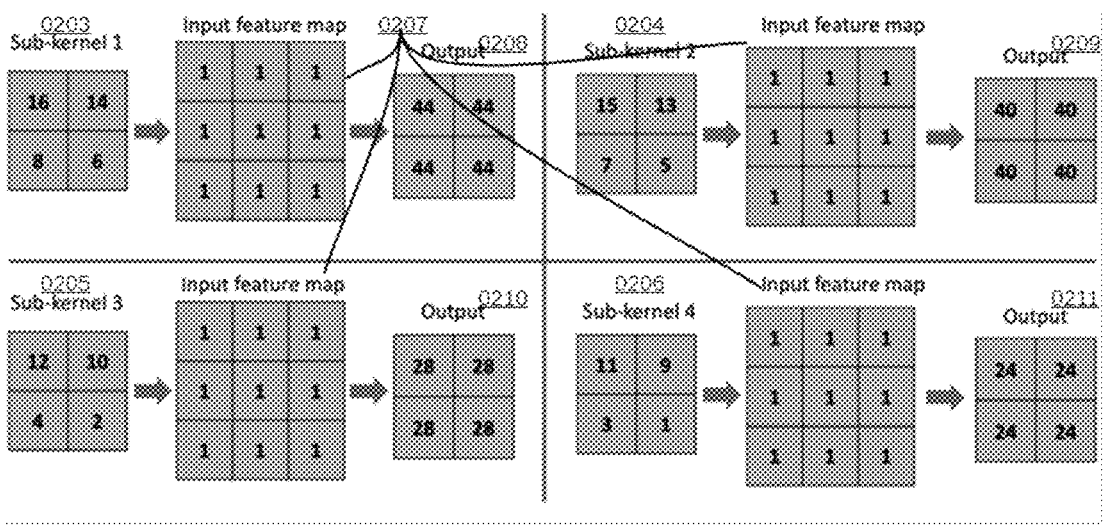
FIG. 2B is an illustration of a second step of the three steps of the example of the second existing approach for implementing deconvolution layers in a two-dimensional setup, wherein the padding parameters are equal to 2.

As illustrated in FIG. 2A, in the first step, the kernel 0201 is reversed and interleave-divided into several sub-kernels 0203 through 0206. The height of the sub-kernel is $$K'_h = \text{Ceil}\left(\frac{K_h}{\text{stride}}\right) = \text{Ceil}\left(\frac{4}{2}\right) = 2$$

and the width of each sub-kernel is $$K'_w = \text{Ceil}\left(\frac{K_w}{\text{stride}}\right) = \text{Ceil}\left(\frac{4}{2}\right) = 2$$

where $K_h$, $K_w$, and stride are the kernel height, kernel width, and the stride parameter, respectively FIG. 2B is an illustration of a second step of the example of the second approach, still in a two-dimensional setup. As illustrated in FIG. 2B, in the second step, the input feature map 0207 is padded and the four sub-kernels 0203 through 0206 are convolved with the padded input feature map individually. The padding on top or bottom of the input feature map 0207 is determined as $P_h=K_h'−1−\text{floor}$ (pad/2)=2−1−floor(2/2)=0 and the padding on left or right of the input feature map 0207 is determined as $P_w=K_w'−1−$ floor(pad/2)=2−1−floor(2/2)=0 where pad is the common value of the two padding parameters. Since the paddings on all the sides are determined to be 0, there is actually no padding to the input feature map 0207. There are 4 output feature maps 0208 through 0211 generated, each with a dimensional measurement of 2×2.

Figure 2C:
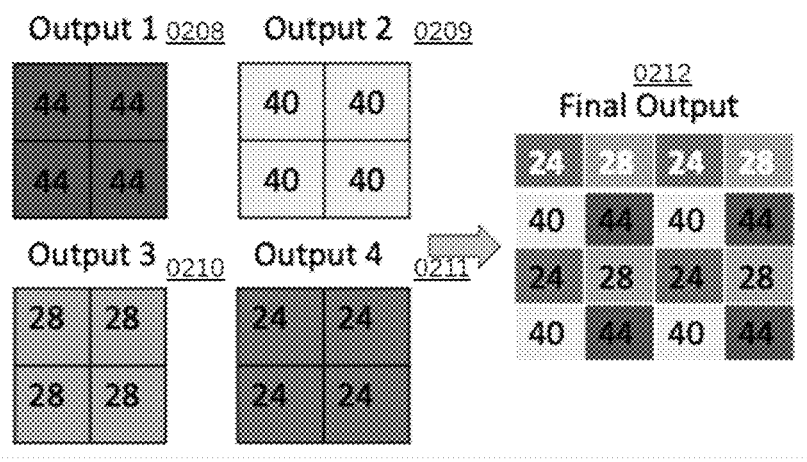
FIG. 2C is an illustration of a third step of the three steps of the example of the second existing approach for implementing deconvolution layers in a two-dimensional setup, wherein the padding parameters are equal to 2.

Then, FIG. 2C is an illustration of a third step of the example of the second approach, still in a two-dimensional setup. As illustrated in FIG. 2C, the four generated 2×2 output feature maps 0208 through 0211 are interleave-concatenated and re-ordered along the dimensional axes to form the final 4×4 output feature map 0212.

The first existing approach is straightforward. However, a large number of 0s will be added between pixels of the feature map when the stride is large. Such a large feature map significantly increases memory consumption on hardware accelerators. Besides, considerable computation resources are wasted because the kernel is convolved with a large number of 0s in the input feature map.

The second existing approach reduces computation/memory consumption compared to the first existing approach. However, this approach has strict constraints on input feature map dimensions, padding parameter, and kernel dimensions. For this approach to work, the padding parameters need to be divisible by 2, and the kernel's dimensional measurements need to be divisible by the stride parameter. Therefore, it is not a general implementation of the deconvolution layer and only works for certain parameter configurations.

Figure 3A:
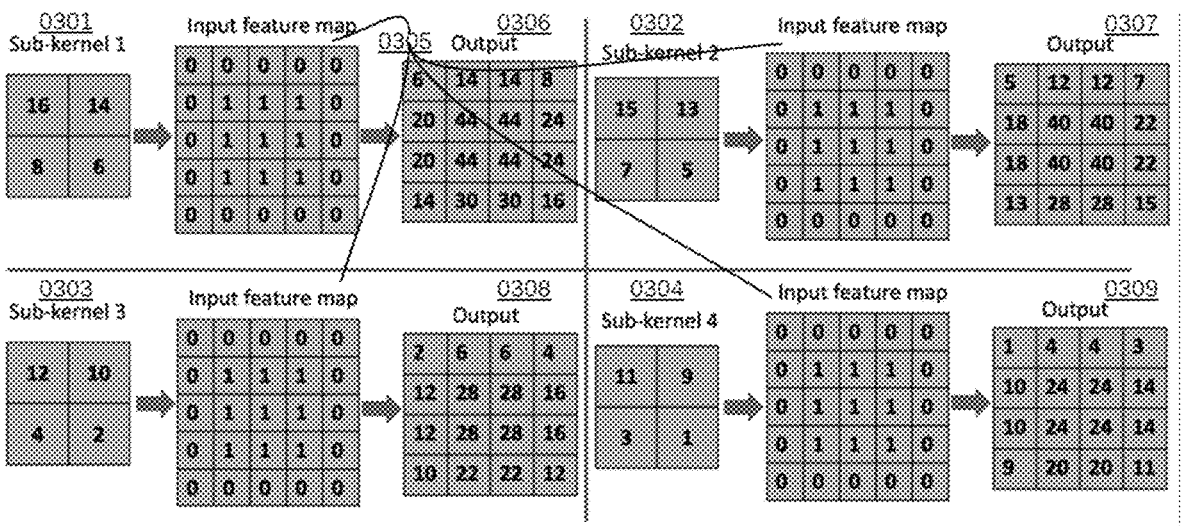
FIG. 3A is an illustration of a padding-and-convolution step of an example leading to problems present in the second existing approach for implementing deconvolution layers in a two-dimensional setup when the padding parameters are equal to 1.

FIG. 3A is an illustration of padding-and-convolution step of an example leading to the problems present in the second existing approach in a two-dimensional setup when the two padding parameters are both 1 (which is not divisible by 2). In this example, the dimensional measurements of the input feature map are 3×3, the dimensional measurements of the kernel are 4×4, and the stride parameter is equal to 2. Therefore, each dimensional measurement of the output feature map would be 2×(3−1)+4−2×1=6, that is, the ground truth dimensional measurements of the output feature map would be 6×6.

The first step in this example is the same as the first step in the last example, since the kernel's dimensional measurements and the stride parameter are the same for both examples.

As illustrated in FIG. 3A, the second (padding and convolution) step in this example requires the padding of the top and bottom for the input feature map to be $$P_h = K'_h − 1 − \text{floor}\left(\frac{\text{pad}}{2}\right) = 1$$

and the padding of the left and right for the input feature map to be $$P_w = K'_w − 1 − \text{floor}\left(\frac{\text{pad}}{2}\right) = 1,$$

since pad is now equal to 1. The convolutions between the sub kernels 0301 through 0304 and the padded input feature map 0305 are then carried out as in the last example, resulting in four 4×4 output feature maps 0306 through 0309.

Figure 3B:
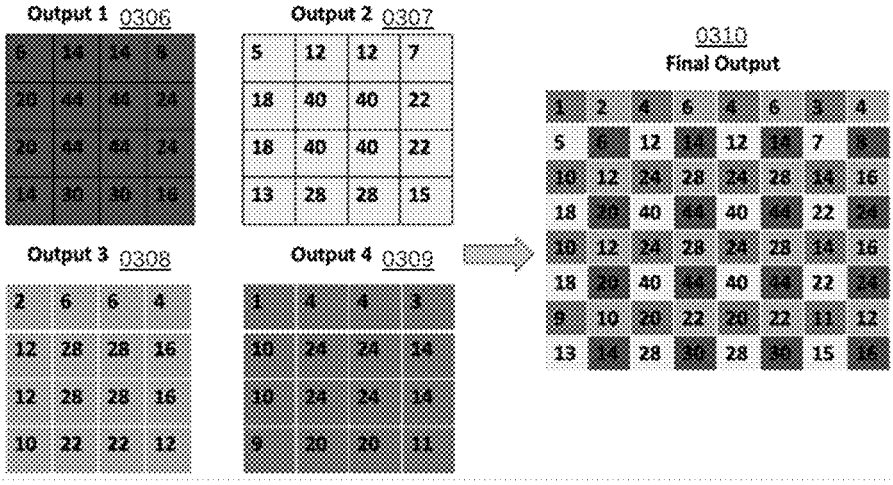
FIG. 3B is an illustration of an interleave-concatenation step of the example leading to the problems present in the second existing approach for implementing deconvolution layers in a two-dimensional setup when the padding parameters are equal to 1.

Then, FIG. 3B is an illustration of interleave-concatenation step of the example leading to the problems present in the second existing approach in a two-dimensional setup when the two padding parameters are both 1. As illustrated in FIG. 3B, the four 4×4 output feature maps 0306 through 0309 are interleave-concatenated and re-ordered into an 8×8 output feature map 0310. However, the dimensional measurements of the ground truth output feature map are 6×6, as calculated above. Therefore, this second existing approach does not work in this example where the padding parameters are not divisible by 2.

Figure 4A:
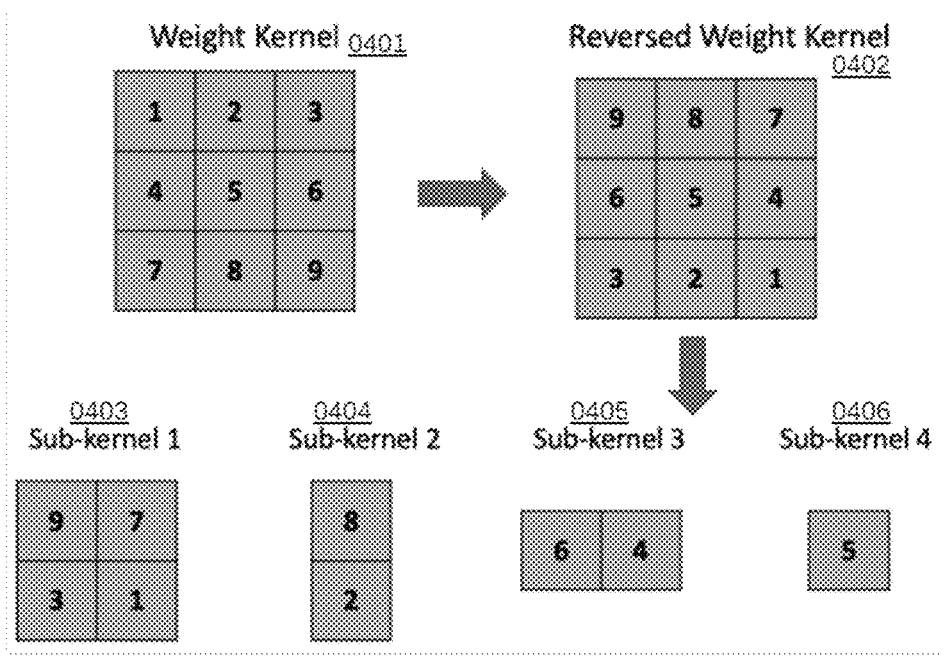
FIG. 4A is an illustration of an interleave-division step of an example leading to problems present in the second existing approach for implementing deconvolution layers in a two-dimensional setup when the kernel's dimensional measurements are not divisible by the stride parameter.

FIG. 4A is an illustration of interleave-division step of an example leading to the problems present in the second existing approach in a two-dimensional setup when the kernel's dimensional measurements are not divisible by the stride parameter. In this example, the dimensional measurements of the input feature map are 3×3, and the dimensional measurements of the kernel 0401 are 3×3, the two padding parameters are both equal to 0, and the stride parameter is equal to 2. The kernel's dimensional measurement on either direction is 3, which is not divisible by the stride parameter (which is equal to 2). Each dimensional measurement of the output feature map would be 2×(3−1)+3−2×0=7, that is, the ground truth dimensional measurements of the output feature map would be 7×7.

Since the kernel's dimensional measurements are not divisible by the stride parameter, the first (interleave-division) step, as illustrated in FIG. 4A, where the kernel is reversed and interleave-divided, results in four sub-kernels 0403 through 0406 that have different dimensional measurements. In fact, one of the sub-kernels 0403 has dimensional measurements 2×2, a second one 0404 has dimensional measurements 2×1, a third one 0405 has dimensional measurements 1×2, and a fourth one 0406 has dimensional measurements 1×1.

Figure 4B:
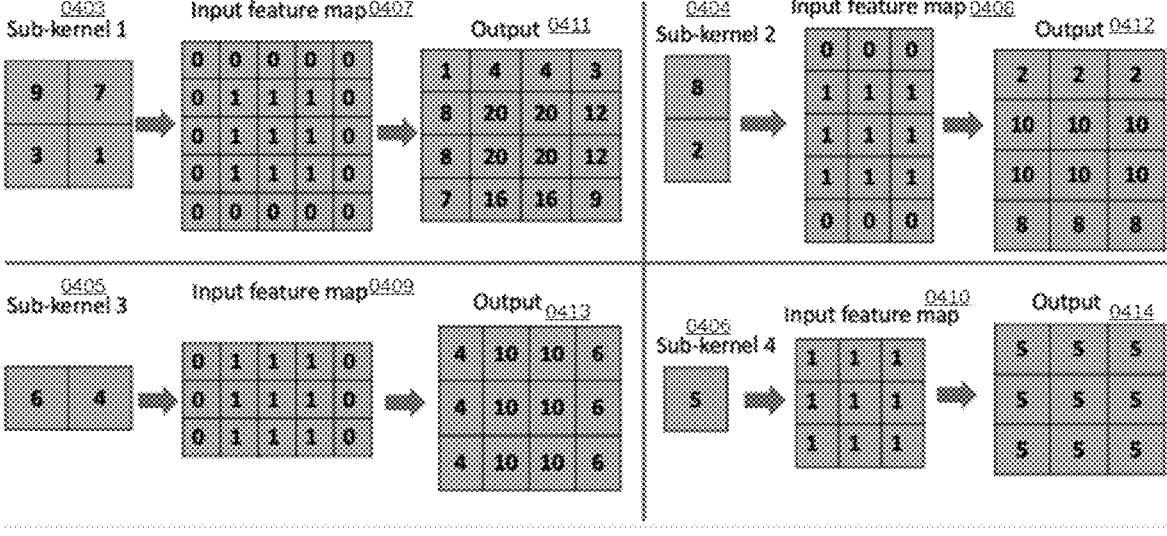
FIG. 4B is an illustration of a padding-and-convolution step of the example leading to problems the present in the second existing approach for implementing deconvolution layers in a two-dimensional setup when the kernel's dimensional measurements are not divisible by the stride parameter.

Then, FIG. 4B is an illustration of padding-and-convolution step of the example leading to the problems present in the second existing approach in a two-dimensional setup when the kernel's dimensional measurements are not divisible by the stride parameter. As illustrated in FIG. 4B, we apply these sub-kernels 0403 through 0406 individually to the padded input feature map. The padding of the top and bottom for the input feature map is $$P_h = K'_h - 1 - \text{floor}\left(\frac{\text{pad}}{2}\right)$$

and the padding of the left and right for the input feature map is $$P_w = K'_w - 1 - \text{floor}\left(\frac{\text{pad}}{2}\right).$$

Because the sub-kernels have different dimensional measurements, the input feature map will also have different paddings for the different sub-kernels, as shown by the padded input feature maps 0407 through 0410, and the resulting four output feature maps 0411 through 0414 all have different dimensional measurements, as shown in FIG. 4B.

Because the four output feature maps 0411 through 0414 have different dimensional measurements, they cannot be interleave-concatenated and reordered along the dimensional axes, and the third step of the second existing approach fails. Therefore, this second existing approach does not work in this example where the kernel's dimensional measurements are not divisible by the stride parameter.

Since the first existing approach requires large amount of computation/memory resources, and the second existing approach places strict constraints on parameters, they both pose practical problems when used in general deconvolution implementation on hardware accelerator.

The present application discloses methods and devices that are not subject to the problems identified above in the two existing approaches.

According to a first aspect of the present application, as illustrated in FIG. 5, a multi-dimensional kernel is sub-sampled into a plurality of non-overlapping multi-dimensional sub-kernels, each in the pre-defined dimensional count, based on a pre-defined common stride parameter (0501), a plurality of multi-dimensional sub-output feature maps in the pre-defined dimensional count is obtained by applying a stride-dependent virtual padded devolution operation between the multi-dimensional input map and each multi-dimensional sub-kernel in the plurality of non-overlapping multi-dimensional sub-kernels (0502), and in response to determining the pre-defined common stride parameter is not greater than two, a pre-defined multi-dimensional interleave-concatenation method is used to interleave-concatenate and reorder the plurality of multi-dimensional sub-output feature maps into the multi-dimensional output feature map (0503), and further, in response to determining the pre-defined common stride parameter is greater than two, the pre-defined multi-dimensional interleave-concatenation method is used to interleave-concatenate and reorder the plurality of multi-dimensional sub-output feature maps into a multi-dimensional intermediate output feature map in the pre-defined dimensional count (0504), and then the multi-dimensional intermediate output feature map is cropped into the multi-dimensional output feature map (0505).

According to one embodiment of the first aspect of the present application, the stride-dependent virtual padded devolution operation between the multi-dimensional input map and a multi-dimensional sub-kernel comprises deriving a virtual padding configuration for the multi-dimensional sub-kernel based on the pre-defined common stride parameter, a plurality of pre-defined common padding parameters with the plurality count equal to the pre-defined dimensional count, a plurality of dimensional measurements of the multi-dimensional sub-kernel, and a relative position of the multi-dimensional sub-kernel with reference to the multi-dimensional kernel, and applying a pre-defined convolution operation between the multi-dimensional input map on one hand, and a virtual multi-dimensional sub-kernel in the pre-defined dimensional count, equivalent to the result of padding the multi-dimensional sub-kernel in accordance with the virtual padding configuration, on the other hand.

In one example, the pre-defined dimensional count is 2 and the plurality of pre-defined common padding parameters comprise a pre-defined common horizontal padding parameter and a predefined common vertical padding parameter.

In one implementation of this example, the virtual padding configuration comprises: to left and right sides of the 2-dimensional sub-kernel, a horizontal padding size equal to the result of subtracting first the number one and then the pre-defined common horizontal padding parameter from a horizontal dimensional measurement of the 2-dimensional sub-kernel, and to top and bottom sides of the 2-dimensional sub-kernel, a vertical padding size equal to the result of subtracting first the number one and then the pre-defined common vertical padding parameter from a vertical dimensional measurement of the 2-dimensional sub-kernel.

In another implementation of this example, the virtual padding configuration comprises: to the left side of the 2-dimensional sub-kernel, a horizontal padding size equal to the result of subtracting first the number one and then an integral division result of dividing the pre-defined common horizontal padding parameter by 2 from the horizontal dimensional measurement of the 2-dimensional sub-kernel, further reduced by a remainder of dividing the pre-defined common horizontal padding parameter by 2 if and only if the relative position of the 2-dimensional sub-kernel with reference to the 2-dimensional kernel is top-left or bottom-left; to the right side of the 2-dimensional sub-kernel, a horizontal padding size equal to the result of subtracting first the number one and then an integral division result of dividing the pre-defined common horizontal padding parameter by 2 from the horizontal dimensional measurement of the 2-dimensional sub-kernel, further reduced by a remainder of dividing the pre-defined common horizontal padding parameter by 2 if and only if the relative position of the 2-dimensional sub-kernel with reference to the 2-dimensional kernel is top-right or bottom-right; to the top side of the 2-dimensional sub-kernel, a vertical padding size equal to the result of subtracting first the number one and then an integral division result of dividing the pre-defined common vertical padding parameter by 2 from the vertical dimensional measurement of the 2-dimensional sub-kernel, further reduced by a remainder of dividing the pre-defined common vertical padding parameter by 2 if and only if the relative position of the 2-dimensional sub-kernel with reference to the 2-dimensional kernel is top-left or top-right; and to the bottom side of the 2-dimensional sub-kernel, a vertical padding size equal to the result of subtracting first the number one and then an integral division result of dividing the pre-defined common vertical padding parameter by 2 from the vertical dimensional measurement of the 2-dimensional sub-kernel, further reduced by a remainder of dividing the pre-defined common vertical padding parameter by 2 if and only if the relative position of the 2-dimensional sub-kernel with reference to the 2-dimensional kernel is bottom-left or bottom-right.

According to another embodiment of the first aspect of the present application, the pre-defined multi-dimensional interleave-concatenation method comprises sequentially interleave-concatenating and reordering the plurality of multi-dimensional sub-output feature maps along each dimensional axis in a plurality of dimensional axes with the plurality count equal to the pre-defined dimensional count, following a pre-defined sequential order for the plurality of dimensional axes, in each intermediate step arriving at a plurality of intermediate interleave-concatenated multi-dimensional sub-output feature maps, and in the end arriving at the multi-dimensional output feature map.

According to a second aspect of the present application, a computing device includes one or more processors, memory and a plurality of programs stored in the memory. The programs, when executed by the one or more processors, cause the computing device to perform operations as described above in the first aspect of the present application.

According to a third aspect of the present application, a non-transitory computer readable storage medium stores a plurality of programs for execution by a computing device having one or more processors. The programs, when executed by the one or more processors, cause the computing device to perform operations as described above in the first aspect of the present application.

The methods disclosed in the present application may be further illustrated by the following several possible implementations in a two-dimensional setup.

In the first possible implementation in a two-dimensional setup, the disclosed method interleave-divides the main kernel into multiple sub-kernels. Then, each sub-kernel is convolved with the input feature map with padding determined by the location of the sub-kernel on the main kernel. Finally, the output feature map from each sub-kernel is merged to yield the final output feature map.

More precisely, in this first possible implementation, we first divide the main kernel into several sub-kernels. Then, each sub-kernel is convolved with the input feature map after the input feature map is virtually padded appropriately. The location of a sub-kernel on the main kernel determines the number of virtual padding that should be added to the input feature map of the sub-kernel. The padding is virtual and is not physically added to the input feature map and thus does not increase the computation and memory consumption on hardware accelerators.

In this first possible implementation, the virtual padding scheme is a simplified one, which only functions when the stride parameter is 1 or 2. If the stride parameter is equal to 1, then the height and width virtual padding of the input feature map for each sub-kernel is calculated as $P_{h/w}=K_{h/w}'-1-pad_{h/w}$ where $K_h'$ and $K_w'$ are the sub-kernel height and width respectively. $pad_h$ and $pad_w$ are the height and width padding of the main kernel respectively. If the stride parameter is equal to 2, the main kernel is always divided into 4 sub-kernels. The input feature map for each of these 4 sub-kernels is padded differently.

Figure 6A:
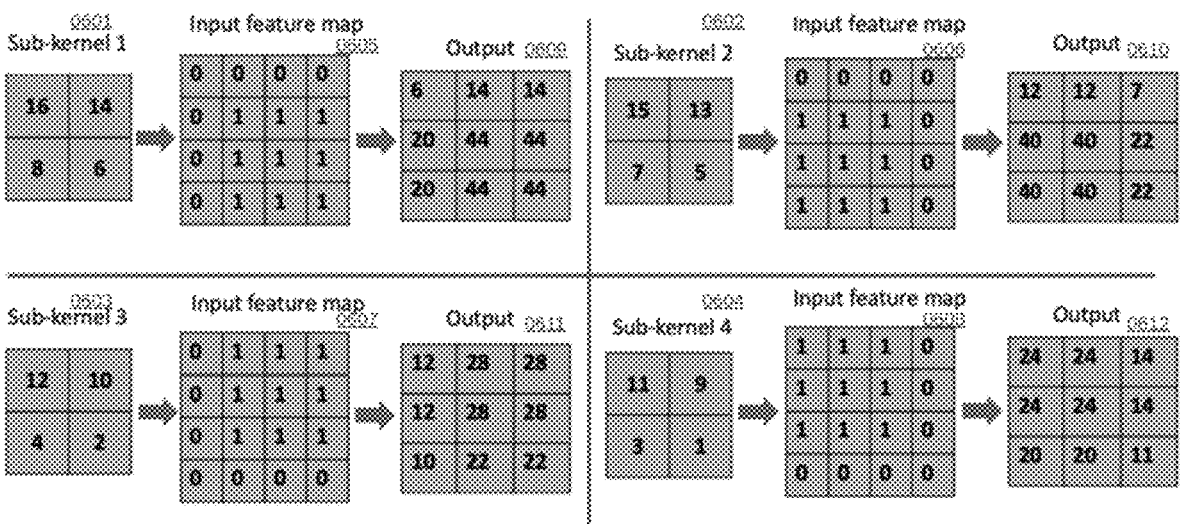
FIG. 6A is an illustration of a padding-and-convolution step of an example of a first possible implementation of the first aspect of the present application in a two-dimensional setup.
Figure 6B:
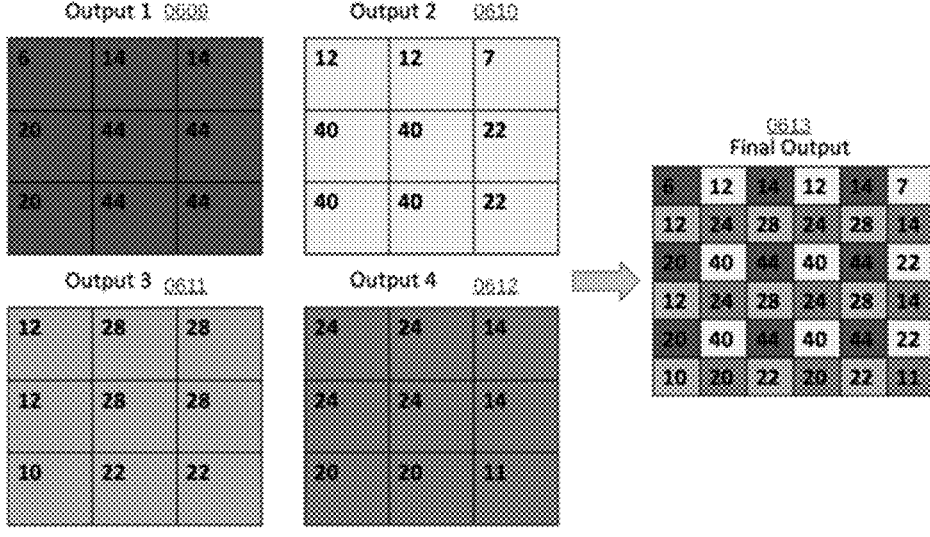
FIG. 6B is an illustration of an interleave-concatenation step of the example of the first possible implementation of the first aspect of the present application in a two-dimensional setup.

In one example of this first possible implementation, illustrated in FIG. 6A and FIG. 6B, the two padding parameters are both 1 (which is not divisible by 2), the dimensional measurements of the input feature map are 3×3, the dimensional measurements of the kernel are 4×4, and the stride parameter is equal to 2. This parameter configuration has been shown not to work for the existing second approach.

FIG. 6A is an illustration of padding-and-convolution step of this one example of this first possible implementation. As illustrated in FIG. 6A, the main kernel has been split into 4 sub-kernels 0601 through 0604. We use the following approach to add padding to the input feature map of each sub-kernel. For sub-kernel 1 (0601) in FIG. 6A, the padding to the top/left side is $P_{h/w}=K_{h/w}'-1-floor(pad_{h/w})=1$ and the padding to the bottom/right side is $P_{h/w}=K_{h/w}'-1-floor(pad_{h/w})-pad_{h/w}\%2=0$. For sub-kernel 2 (0602) in FIG. 6A, the padding to the top/right side is $P_{h/w}=K_{h/w}'-1-floor(pad_{h/w})=1$ and the padding to the bottom/left side is $P_{h/w}=K_{h/w}'-1-floor(pad_{h/w})-pad_{h/w}\%2=0$. For sub-kernel 3 (0603) in FIG. 6A, the padding to the bottom/left side is $P_{h/w}=K_{h/w}'-1-floor(pad_{h/w})=1$ and the padding to the top/right side is $P_{h/w}=K_{h/w}'-1-floor(pad_{h/w})-pad_{h/w}\%2=0$. For sub-kernel 4 (0604) in FIG. 6A, the padding to the bottom/right side is $P_{h/w}=K_{h/w}'-1-floor(pad_{h/w})=1$ and the padding to the top/left side is $P_{h/w}=K_{h/w}'-1-floor(pad_{h/w})-pad_{h/w}\%2=0$. Then, each sub-kernel is convolved with its input feature map (0605 through 0608) to result in four output feature maps (0609 through 0612).

Then, FIG. 6B is an illustration of interleave-concatenation step of this one example of this first possible implementation. As illustrated in FIG. 6B, the output feature maps 0609 through 0612 from each sub-kernel are interleave-concatenated and reordered to generate the final output feature map 0613. The obtained output feature map 0613 has dimensional measurements of 6×6, the same as the ground truth dimensional measurements of the output feature map for this parameter configuration.

This example shows that the disclosed method works on padding parameters that are not divisible by 2, thus the disclosed method works on more parameter configurations than the second existing approach. However, this first possible implementation does not function properly when the stride parameter is greater than 2, since the procedure described for this first possible implementation only provides padding formulae for stride parameter of 1 or 2. In order to show that the disclosed method also works when the stride parameter is greater than 2, we present a second possible implementation in a 2-dimensional setup below.

In the second possible implementation, padding on the input feature map is determined based on the sub-kernel dimensional measurements, and after merging output feature maps from sub-kernels, the resulted feature map is then cropped to produce the final output feature map. Compared to the first possible implementation, this second possible implementation is a more general implementation of deconvolution layers.

Figure 7A:
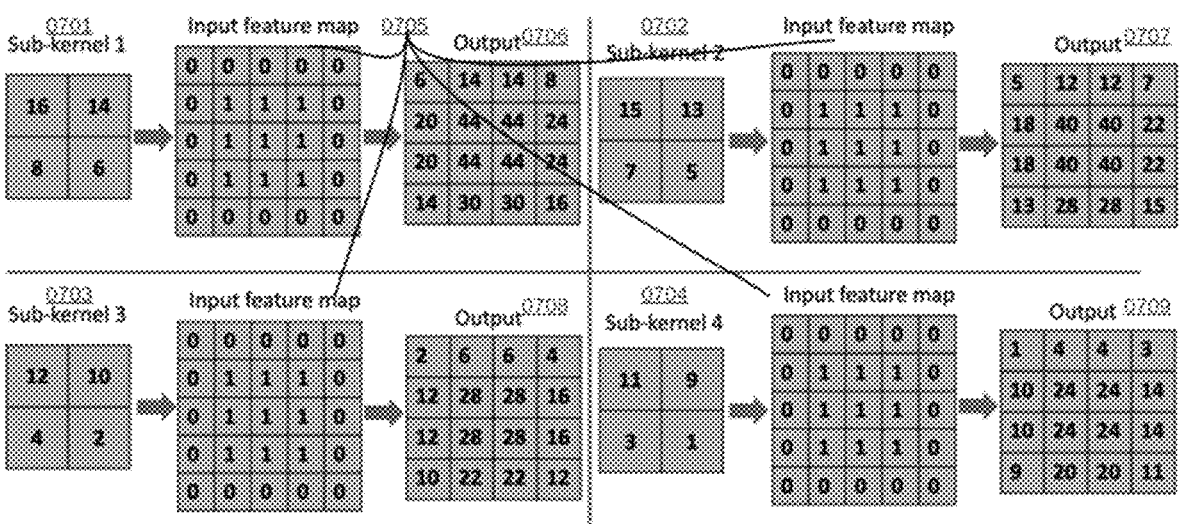
FIG. 7A is an illustration of a padding-and-convolution step of an example of a second possible implementation of the first aspect of the present application in a two-dimensional setup.
Figure 7B:
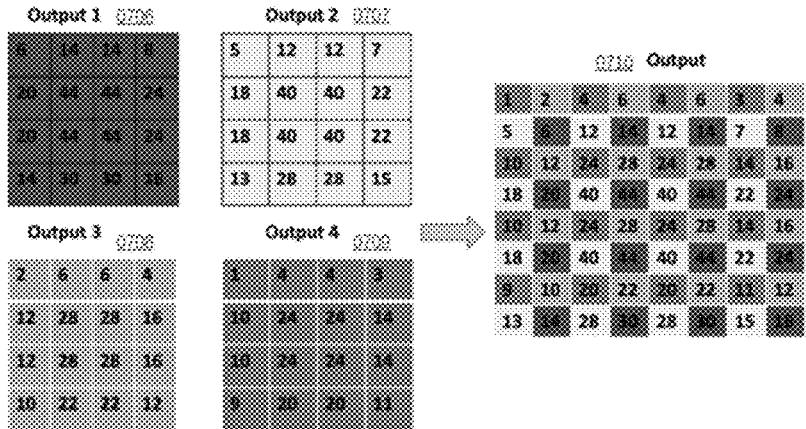
FIG. 7B is an illustration of an interleave-concatenation step of the example of the second possible implementation of the first aspect of the present application in a two-dimensional setup.
Figure 7C:
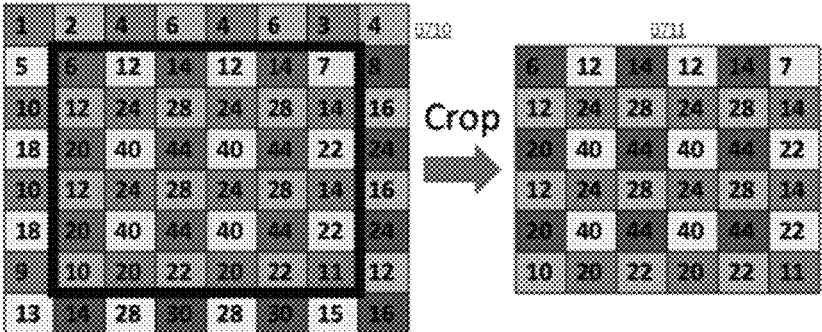
FIG. 7C is an illustration of a cropping step of the example of the second possible implementation of the first aspect of the present application in a two-dimensional setup.

In one example, illustrated in FIG. 7A, FIG. 7B and FIG. 7C, the parameters are the same as the parameters in the example for the first possible implementation, the first step, which is to split the main kernel into several sub-kernels, is the same as the first step in the first possible implementation.

FIG. 7A is an illustration of padding-and-convolution step of this one example of this second possible implementation. In this (second) step, we add padding to the top/bottom/left/right side of the input feature map of each sub-kernel according to the sub-kernel size. Mathematically, the padding formula is expressed as $P_{h/w}=K_{h/w}'-1$. In this example, as illustrated in FIG. 7A, the main kernel is split into 4 sub-kernels 0701 through 0704. Each sub-kernel has dimensional measurements of 2×2 and therefore the padding is 1 on each side of the input feature map. Each sub-kernel is convolved with the same padded input feature map 0705, and four output feature maps 0706 through 0709 are obtained.

Then, FIG. 7B is an illustration of interleave-concatenation step of this one example of this second possible implementation. As illustrated in FIG. 7B, the four output feature maps 0706 through 0709 are interleave-concatenated and reordered to yield the merged output feature map 0710. However, the dimensional measurements of this merged output feature map 0710 are 8×8, greater than the dimensional measurements of the ground truth output feature map, which are 6×6. The difference is caused by the calculated padding value to the input feature map (1 in this example) from the parameters, that is, the merged output feature map 0710 is larger on each direction than the ground truth output feature map by the total amount of padding introduced on that direction (2 in this example).

To arrive at the correct dimensional measurements of the ground truth output feature map, the merged output feature map 0710 undergoes a final step of cropping. FIG. 7C is an illustration of this cropping step. As illustrated in FIG. 7C, the final output feature map 0711 has the correct dimensional measurements of the ground truth output feature map. Where to crop is determined by the calculated padding value to the input feature map.

The second possible implementation is well defined for any stride value, whether greater than 2 or not, therefore it supports more parameter configurations than the first possible implementation, but it has higher memory consumption. Therefore, a combined implementation of the present application, wherein the second possible implementation is used only when the parameter configuration requires this implementation, and the first possible implementation is used otherwise, would be advantageous.

The first and second possible implementations both require even division of the kernel into sub-kernels, and therefore they both require the kernel dimensions to be divisible by the stride parameter. Otherwise, output feature maps from sub-kernels will have different dimensional measurements and cannot be concatenated along the dimensional axes.

A third possible implementation of the methods disclosed in the current application is not subject to this requirement on kernel dimensions and stride parameter. In this third possible implementation, the main kernel is split into s rows and s columns where s is the stride of the main kernel and the strides on the height axis and on the width axis are equal (as there is only one stride parameter). The total number of sub-kernels is s×s. The output feature maps of sub-kernels from the same rows of the main kernel are then interleave-concatenated and reordered along the width dimensional axis. After this concatenation, there will be s partially interleave-concatenated output feature maps. Then, we inter-leave-concatenate and reorder the s partially interleave-concatenated output feature maps along the height dimensional axis to yield the final output feature map.

Figure 8A:
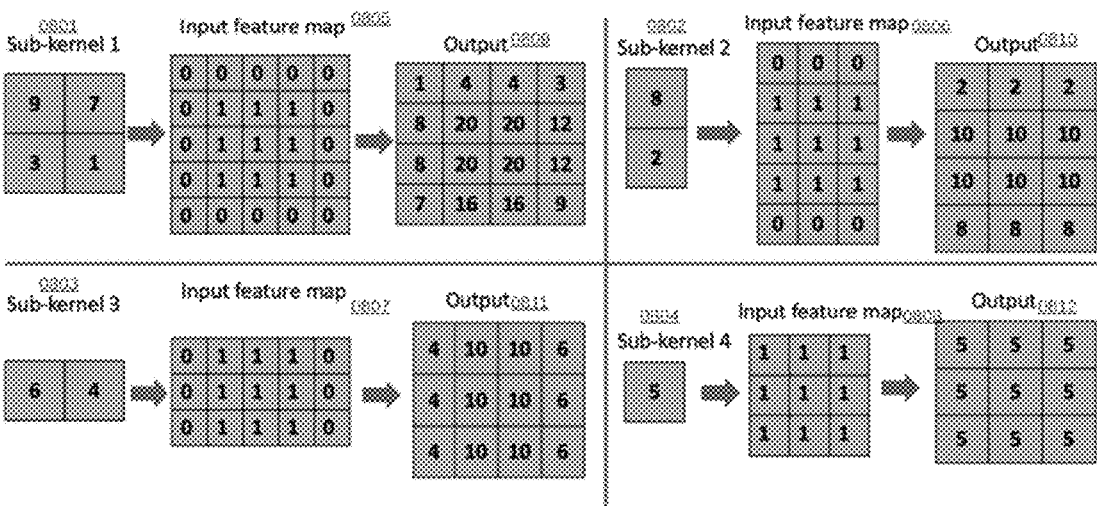
FIG. 8A is an illustration of a padding-and-convolution step of an example of a third possible implementation of the first aspect of the present application in a two-dimensional setup.
Figure 8B:
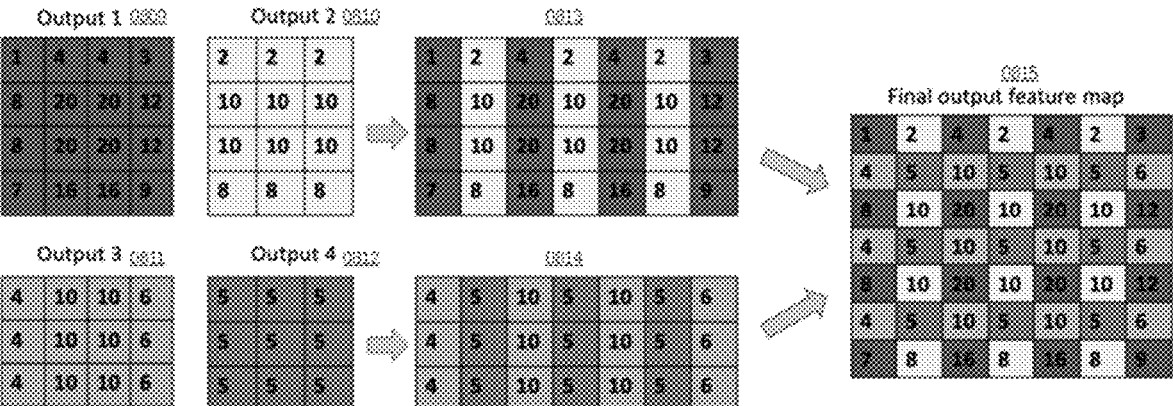
FIG. 8B is an illustration of an interleave-concatenation step of the example of the third possible implementation of the first aspect of the present application in a two-dimensional setup.

In this example, illustrated in FIG. 8A and FIG. 8B, the dimensional measurements of the input feature map are 3×3 and the dimensional measurements of the kernel are also 3×3, the stride parameter is equal to 2 and the two padding parameters are both equal to 0. The ground truth dimensional measurements of the output feature map would be 7×7, as calculated above. This parameter configuration has been shown not to work for the second existing approach.

First, FIG. 8A is an illustration of padding-and-convolution step of an example of this third possible implementation. As illustrated in FIG. 8A, the main kernel is split into 2 rows and 2 columns to create 4 sub-kernels 0801 through 0804. Then, each sub-kernel is convolved with the corresponding input feature map (0805 through 0808) with the padding based on the sub-kernel dimensional measurements, and four output feature maps 0809 through 0812 are obtained. The padding calculation is the same as in the first possible implementation detailed above.

Then, FIG. 8B is an illustration of interleave-concatenation step of this example of this third possible implementation. As illustrated in FIG. 8B, the two output feature maps 0809 and 0810, generated by sub-kernels 0801 and 0802 from the same row of the main kernel, are interleave-concatenated and reordered along the width dimensional axis to reach an intermediate interleave-concatenated output feature map 0813. Similarly, the two output feature maps 0811 and 0812, generated by sub-kernels 0803 and 0804 from the same row of the main kernel, are interleave-concatenated and reordered along the width dimensional axis to reach an intermediate interleave-concatenated output feature map 0814. Then, the two intermediate interleave-concatenated output feature maps 0813 and 0814 are interleave-concatenated and reordered along the height dimensional axis to yield the final output feature map 0815, in the correct dimensional measurements of 7×7, equal to the ground truth dimensional measurements of the output feature map.

Figure 9:
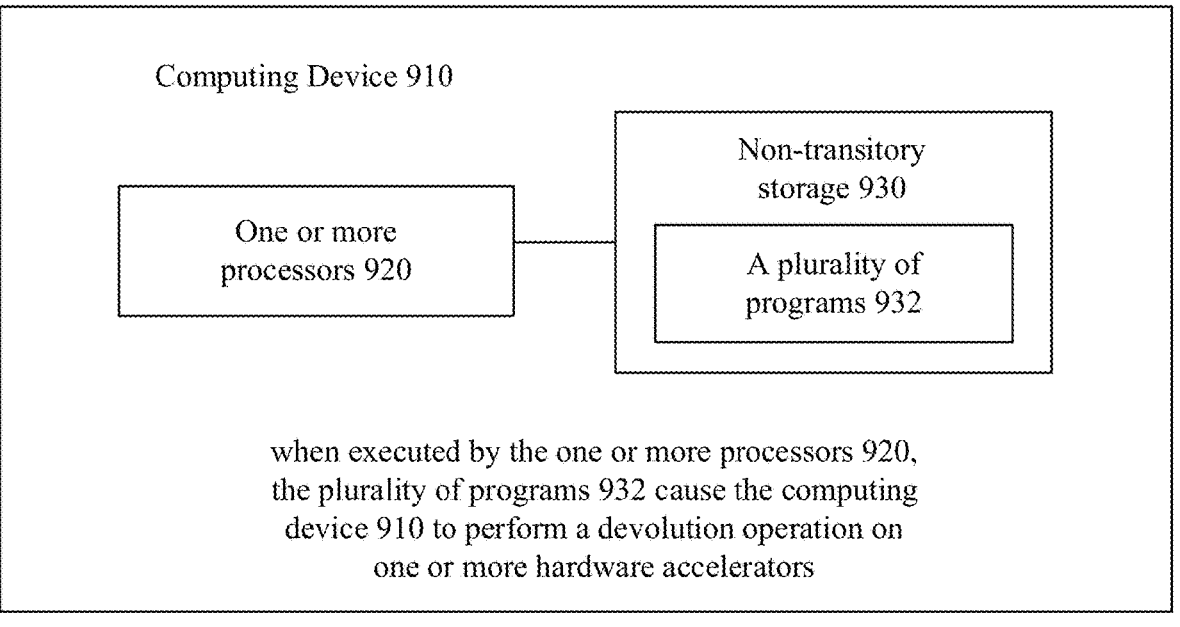
FIG. 9 is a block diagram illustrating a computing device corresponding to some examples of the second aspect of the present disclosure.

FIG. 9 is a block diagram illustrating a computing device corresponding to some examples of the second aspect of the present disclosure. In one or more examples, a computing device 910 includes one or more processors 920; a non-transitory storage 930 coupled to the one or more processors 920; and a plurality of programs 932 stored in the non-transitory storage 930 that, when executed by the one or more processors 920, cause the computing device 910 to perform a devolution operation on one or more hardware accelerators.

Figure 10:
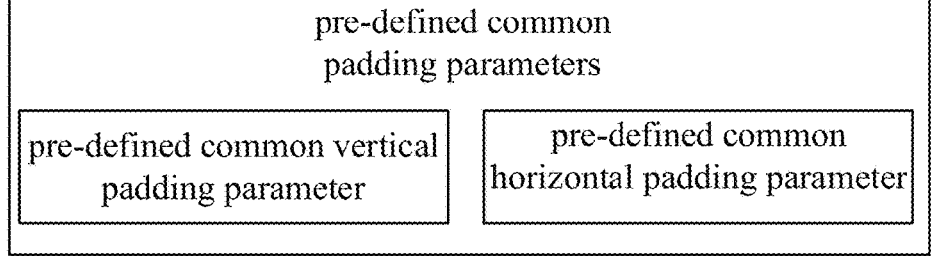
FIG. 10 is a block diagram illustrating a pre-defined dimensional count and pre-defined common padding parameters corresponding to some examples of the second aspect of the present disclosure.

FIG. 10 is a block diagram illustrating a pre-defined dimensional count and pre-defined common padding parameters corresponding to some examples of the second aspect of the present disclosure. In one or more examples, a pre-defined dimensional count is 2 and a plurality of pre-defined common padding parameters include a pre-defined common horizontal padding parameter and a predefined common vertical padding parameter.

Figure 11:
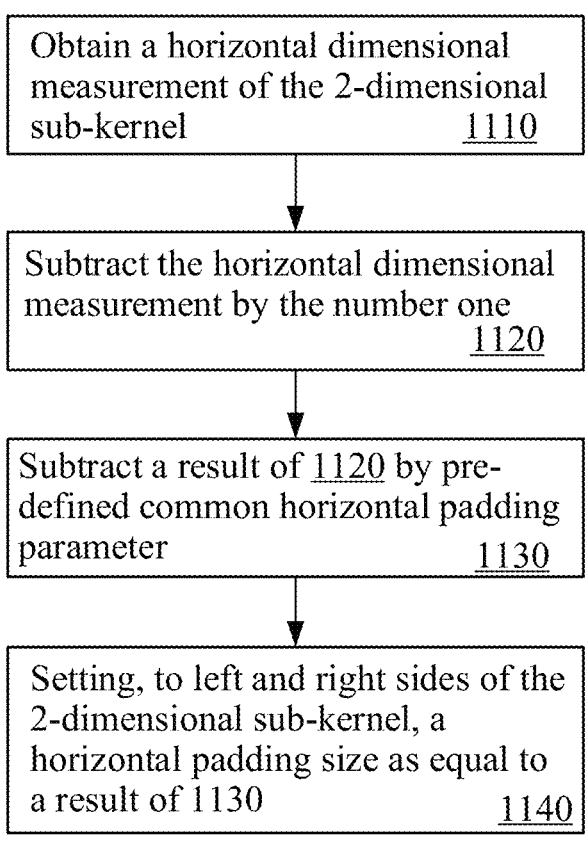
FIG. 11 is a flow chart illustrating computation of a horizontal padding size in virtual padding corresponding to some examples of the second aspect of the present disclosure.

FIG. 11 is a flow chart illustrating computation of a horizontal padding size in virtual padding corresponding to some examples of the second aspect of the present disclosure. In one or more examples, at Step 1110, the computing device 910 may obtain a horizontal dimensional measurement of the 2-dimensional sub-kernel; at Step 1120, the computing device 910 may subtract the horizontal dimensional measurement by the number one; at Step 1130, the computing device 910 may subtract a result of Step 1120 by pre-defined common horizontal padding parameter; and at Step 1140, the computing device 910 may set, to left and right sides of the 2-dimensional sub-kernel, the horizontal padding size as equal to a result of 1130.

Figure 12:
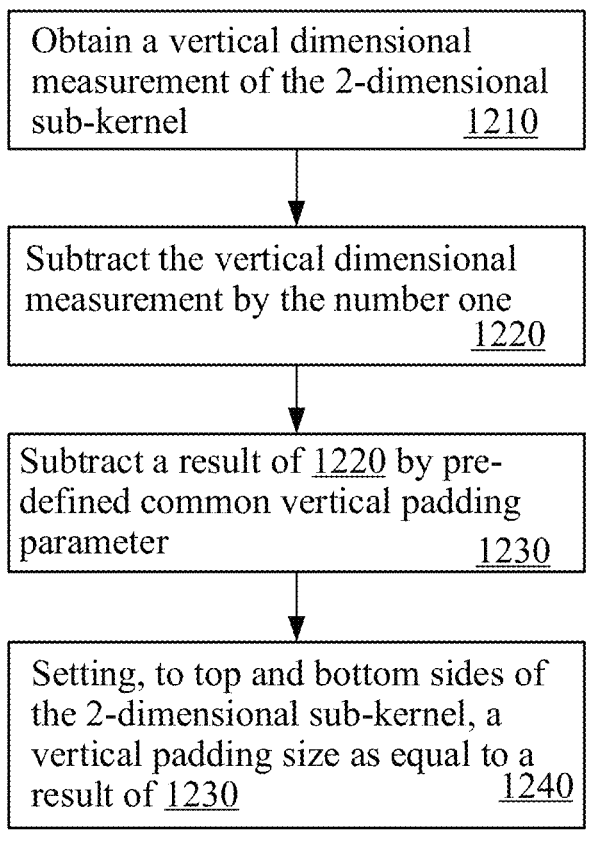
FIG. 12 is a flow chart illustrating computation of a vertical padding size in the virtual padding corresponding to some examples of the second aspect of the present disclosure.

FIG. 12 is a flow chart illustrating computation of a vertical padding size in the virtual padding corresponding to some examples of the second aspect of the present disclosure. In one or more examples, at Step 1210, the computing device 910 may obtain a vertical dimensional measurement of the 2-dimensional sub-kernel; at Step 1220, the computing device 910 may subtract the vertical dimensional measurement by the number one; at Step 1230, the computing device 910 may subtract a result of Step 1220 by pre-defined common vertical padding parameter; and at Step 1240, the computing device 910 may set, to top and bottom sides of the 2-dimensional sub-kernel, the vertical padding size as equal to a result of 1230.

Figure 13:
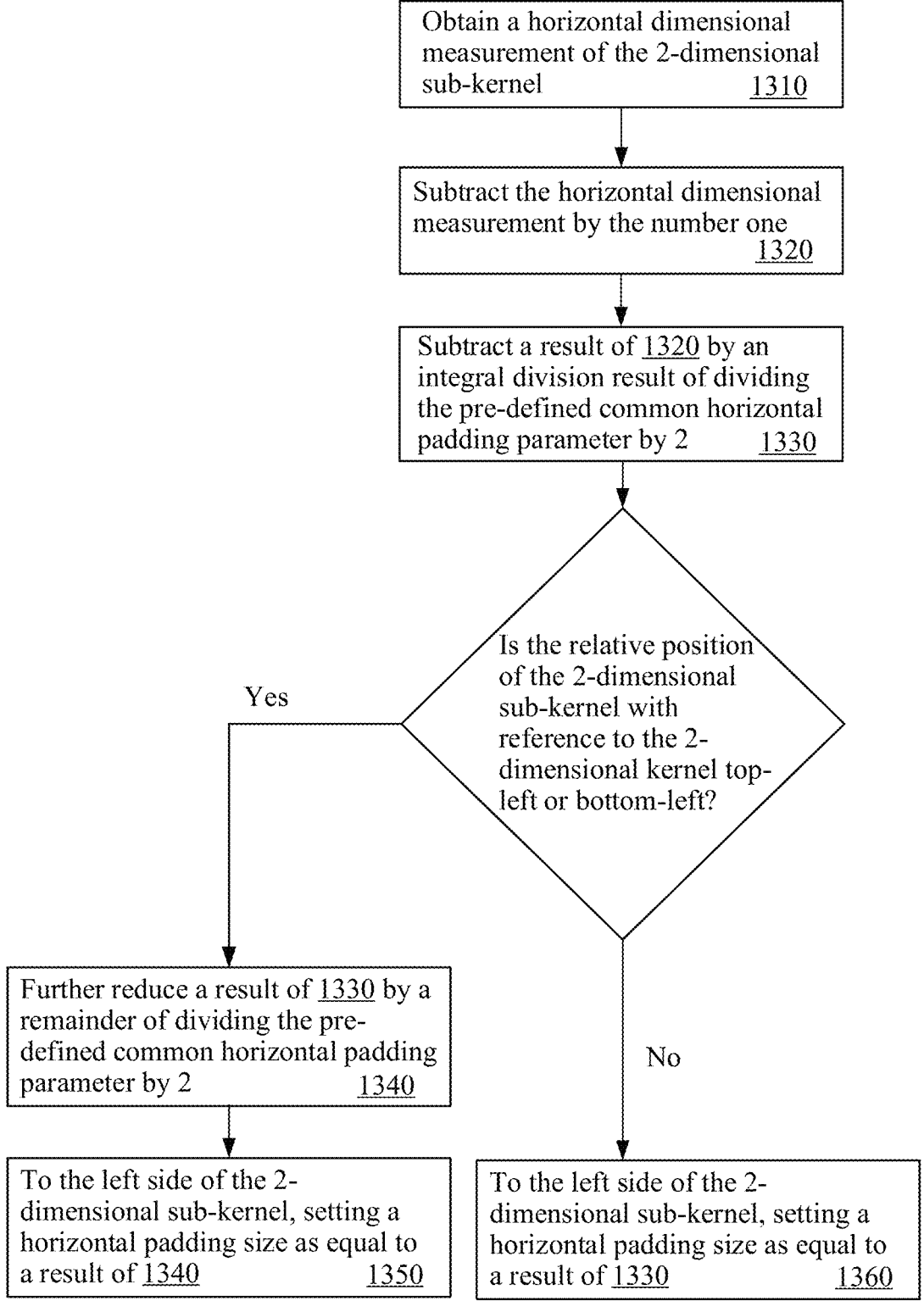
FIG. 13 is a flow chart illustrating computation of a horizontal padding size in virtual padding corresponding to some examples of the second aspect of the present disclosure.

FIG. 13 is a flow chart illustrating computation of a horizontal padding size in virtual padding corresponding to some examples of the second aspect of the present disclosure. In one or more examples, at Step 1310, the computing device 910 may obtain a horizontal dimensional measurement of the 2-dimensional sub-kernel; at Step 1320, the computing device 910 may subtract the horizontal dimensional measurement by the number one; at Step 1330, the computing device 910 may subtract a result of 1320 by an integral division result of dividing the pre-defined common horizontal padding parameter by 2; in response to the relative position of the 2-dimensional sub-kernel with reference to the 2-dimensional kernel being top-left or bottom-left, at Step 1340, the computing device may further reduce a result of 1330 by a remainder of dividing the pre-defined common horizontal padding parameter by 2, and at Step 1350, the computing device may, to the left side of the 2-dimensional sub-kernel, set the horizontal padding size as equal to a result of 1340; otherwise, at Step 1360, the computing device may, to the left side of the 2-dimensional sub-kernel, set the horizontal padding size as equal to a result of 1330.

Figure 14:
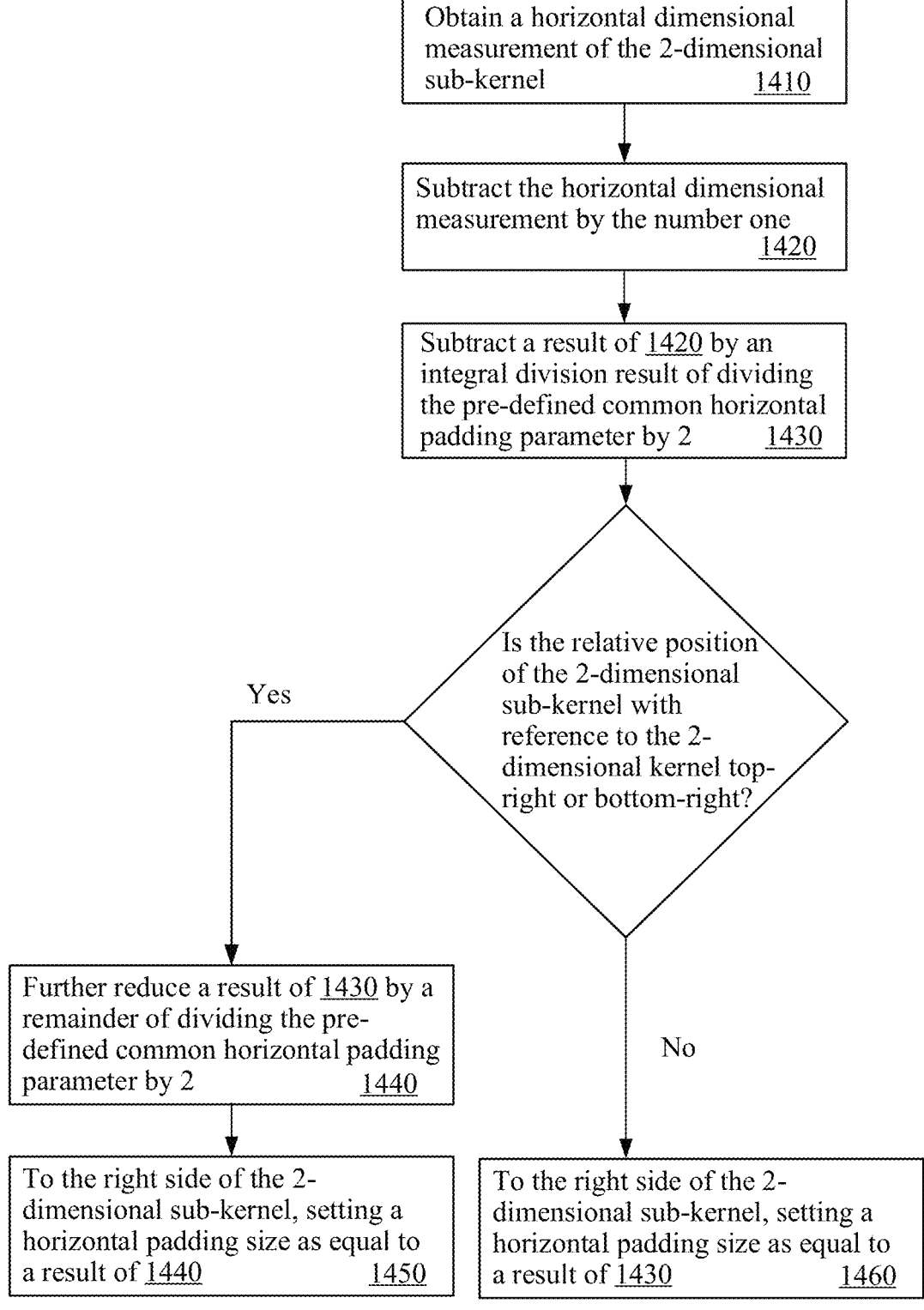
FIG. 14 is a flow chart illustrating computation of a horizontal padding size in the virtual padding corresponding to some examples of the second aspect of the present disclosure.

FIG. 14 is a flow chart illustrating computation of a horizontal padding size in the virtual padding corresponding to some examples of the second aspect of the present disclosure. In one or more examples, at Step 1410, the computing device 910 may obtain a horizontal dimensional measurement of the 2-dimensional sub-kernel; at Step 1420, the computing device 910 may subtract the horizontal dimensional measurement by the number one; at Step 1430, the computing device 910 may subtract a result of 1420 by an integral division result of dividing the pre-defined common horizontal padding parameter by 2; in response to the relative position of the 2-dimensional sub-kernel with reference to the 2-dimensional kernel being top-right or bottom-right, at Step 1440, the computing device may further reduce a result of 1430 by a remainder of dividing the pre-defined common horizontal padding parameter by 2, and at Step 1450, the computing device may, to the right side of the 2-dimensional sub-kernel, set the horizontal padding size as equal to a result of 1440; otherwise, at Step 1460, the computing device may, to the right side of the 2-dimensional sub-kernel, set the horizontal padding size as equal to a result of 1430.

Figure 15:
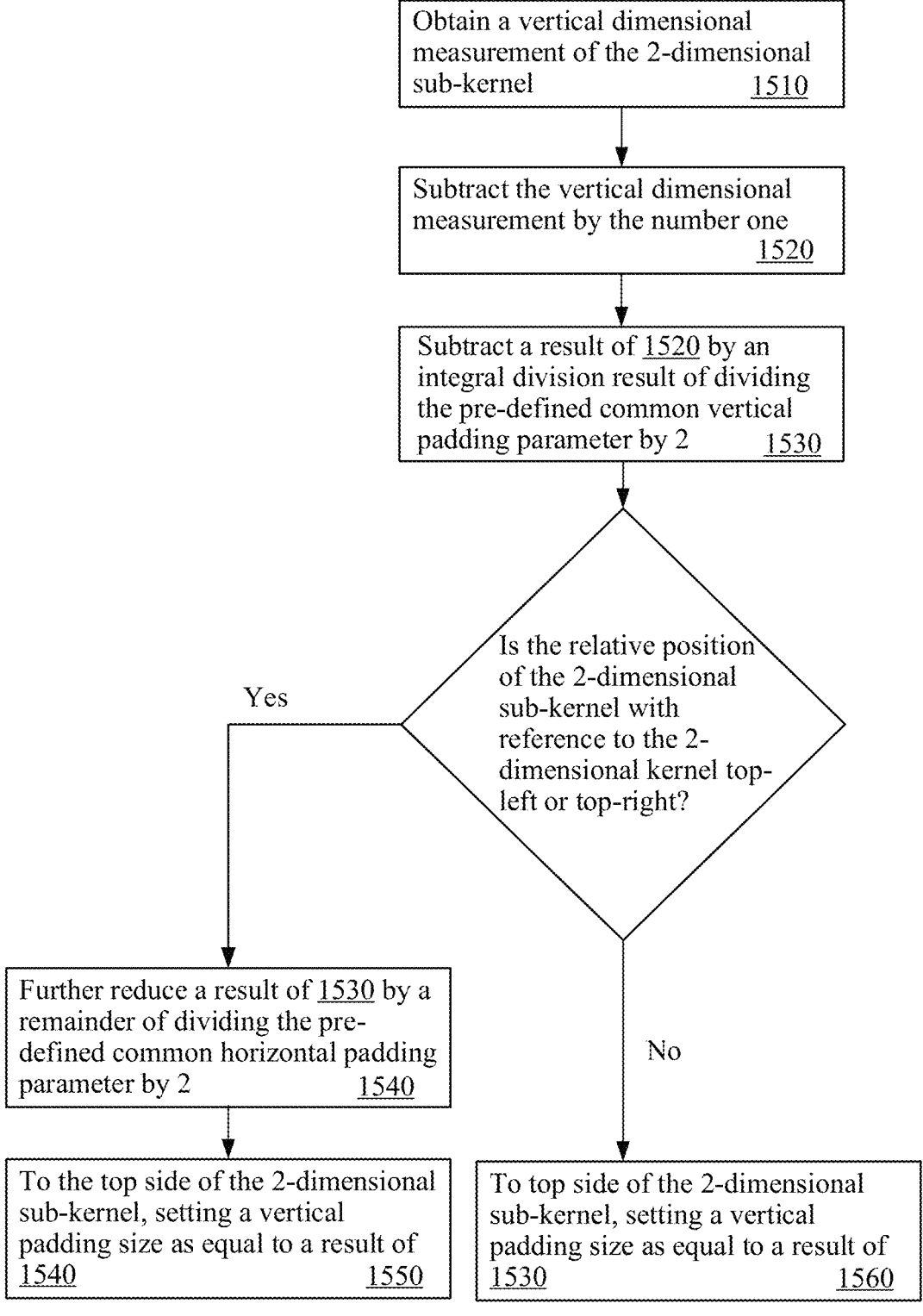
FIG. 15 is a flow chart illustrating computation of a vertical padding size in the virtual padding corresponding to some examples of the second aspect of the present disclosure.

FIG. 15 is a flow chart illustrating computation of a vertical padding size in the virtual padding corresponding to some examples of the second aspect of the present disclosure. In one or more examples, at Step 1510, the computing device 910 may obtain a vertical dimensional measurement of the 2-dimensional sub-kernel; at Step 1520, the computing device 910 may subtract the vertical dimensional measurement by the number one; at Step 1530, the computing device 910 may subtract a result of 1520 by an integral division result of dividing the pre-defined common vertical padding parameter by 2; in response to the relative position of the 2-dimensional sub-kernel with reference to the 2-dimensional kernel being top-left or top-right, at Step 1540, the computing device may further reduce a result of 1530 by a remainder of dividing the pre-defined common vertical padding parameter by 2, and at Step 1550, the computing device may, to the top side of the 2-dimensional sub-kernel, set the vertical padding size as equal to a result of 1540; otherwise, at Step 1560, the computing device may, to the top side of the 2-dimensional sub-kernel, set the vertical padding size as equal to a result of 1530.

Figure 16:
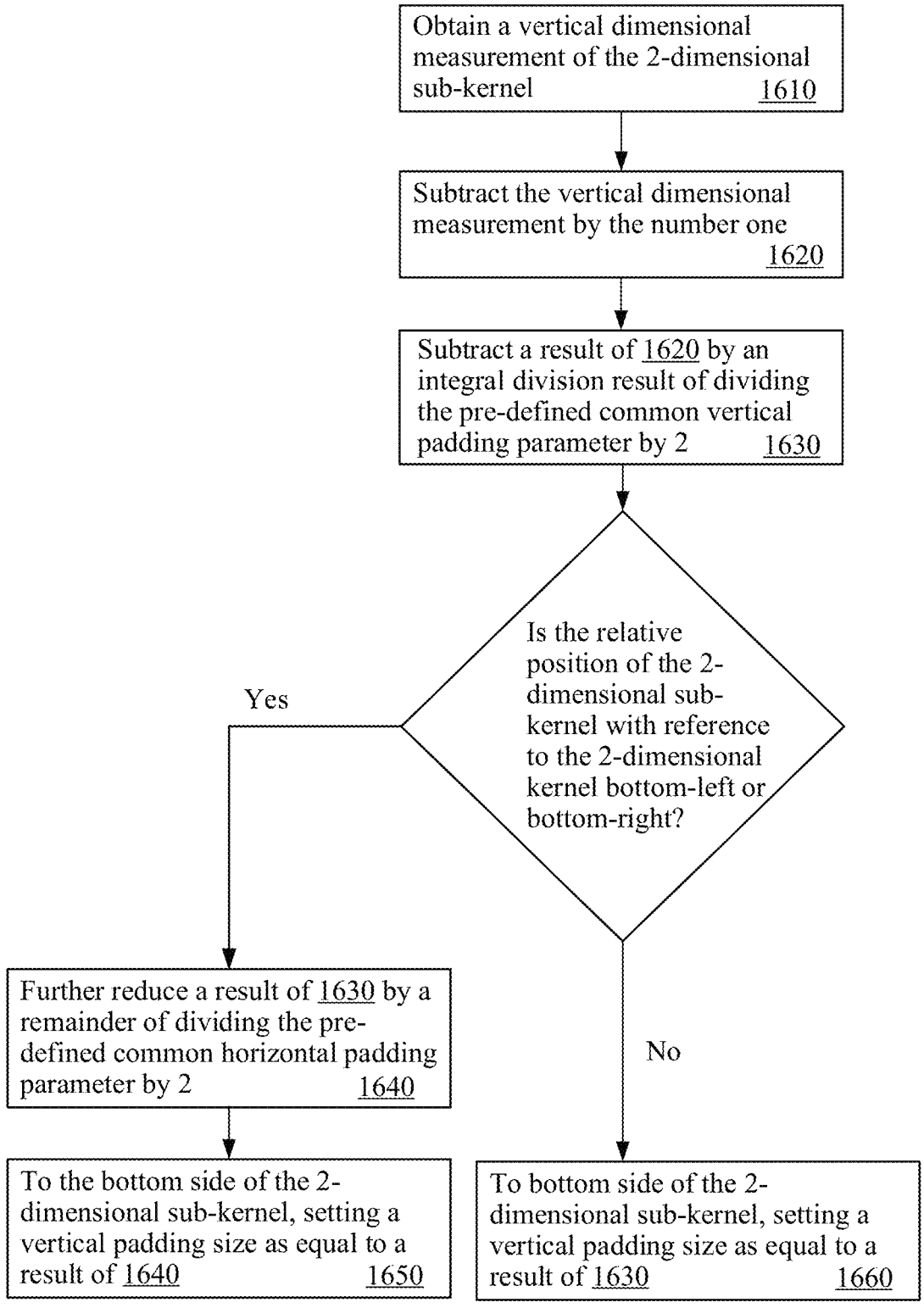
FIG. 16 is a flow chart illustrating computation of a vertical padding size in the virtual padding corresponding to some examples of the second aspect of the present disclosure.

FIG. 16 is a flow chart illustrating computation of a vertical padding size in the virtual padding corresponding to some examples of the second aspect of the present disclosure. In one or more examples, at Step 1610, the computing device 910 may obtain a vertical dimensional measurement of the 2-dimensional sub-kernel; at Step 1620, the computing device 910 may subtract the vertical dimensional measurement by the number one; at Step 1630, the computing device 910 may subtract a result of 1620 by an integral division result of dividing the pre-defined common vertical padding parameter by 2; in response to the relative position of the 2-dimensional sub-kernel with reference to the 2-dimensional kernel being bottom-left or bottom-right, at Step 1640, the computing device may further reduce a result of 1630 by a remainder of dividing the pre-defined common vertical padding parameter by 2, and at Step 1650, the computing device may, to the bottom side of the 2-dimensional sub-kernel, set the vertical padding size as equal to a result of 1640; otherwise, at Step 1660, the computing device may, to the bottom side of the 2-dimensional sub-kernel, set the vertical padding size as equal to a result of 1630.

Compared to the first existing approach, all these possible implementations reduce computation/memory consumption significantly. Compared to the second existing approach, the disclosed method in the current application, as shown in the three possible implementations, is an efficient general implementation of deconvolution layers and removes the strict constraints of the second existing approach on parameter configuration.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the apparatus or system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

We claim:

1. A method for implementing a deconvolution operation between a multi-dimensional kernel in a pre-defined dimensional count and a multi-dimensional input map in the pre-defined dimensional count to obtain a multi-dimensional output feature map in the pre-defined dimensional count, comprising:

subsampling, by one or more hardware accelerators based on a deep neural network, the multi-dimensional kernel into a plurality of non-overlapping multi-dimensional sub-kernels, each in the pre-defined dimensional count, based on a pre-defined common stride parameter, wherein the multi-dimensional kernel comprises four sides, the plurality of multi-dimensional sub-kernels are positioned at different internal locations of the multi-dimensional kernel such that each multi-dimensional sub-kernel is located proximate to a respective pair of adjacent sides among the four sides of the multi-dimensional kernel;

obtaining, by the one or more hardware accelerators based on the deep neural network, a plurality of multi-dimensional sub-output feature maps in the pre-defined dimensional count, wherein the deep neural network comprises a deconvolution layer that deconvolves the multi-dimensional input map with each multi-dimensional sub-kernel in the plurality of non-overlapping multi-dimensional sub-kernels to obtain the plurality of multi-dimensional sub-output feature maps; and in response to determining the pre-defined common stride parameter is not greater than two, using a pre-defined multi-dimensional interleave-concatenation method to interleave-concatenate and reorder, by the one or more hardware accelerators based on the deep neural network, the plurality of multi-dimensional sub-output feature maps into the multi-dimensional output feature map; and wherein the deconvolution operation further comprises:

before the multi-dimensional input map is deconvolved with each multi-dimensional sub-kernel, virtually padding, by the one or more hardware accelerators based on the deep neural network, two adjacent input map sides of the multi-dimensional input map for each multi-dimensional sub-kernel based on each multi-dimensional sub-kernel's internal location of the multi-dimensional kernel, wherein the two adjacent input map sides are associated with a corresponding pair of adjacent sides of the multi-dimensional kernel.

2. The method of claim 1, further comprising:

in response to determining the pre-defined common stride parameter is greater than two, using the pre-defined multi-dimensional interleave-concatenation method to interleave-concatenate and reorder the plurality of multi-dimensional sub-output feature maps into a multi-dimensional intermediate output feature map in the pre-defined dimensional count, and then cropping the multi-dimensional intermediate output feature map into the multi-dimensional output feature map.

3. The method of claim 1, wherein the stride-dependent virtual padded deconvolution operation between the multi-dimensional input map and a multi-dimensional sub-kernel comprises:

deriving a virtual padding configuration for the multi-dimensional sub-kernel based on the pre-defined common stride parameter, a plurality of pre-defined common padding parameters with the plurality count equal to the pre-defined dimensional count, a plurality of dimensional measurements of the multi-dimensional sub-kernel, and a relative position of the multi-dimensional sub-kernel with reference to the multi-dimensional kernel; and applying a pre-defined deconvolution operation between the multi-dimensional input map on one hand, and a virtual multi-dimensional sub-kernel in the pre-defined dimensional count, equivalent to the result of padding the multi-dimensional sub-kernel in accordance with the virtual padding configuration, on the other hand.

4. The method of claim 1, wherein the pre-defined multi-dimensional interleave-concatenation method comprises sequentially interleave-concatenating and reordering the plurality of multi-dimensional sub-output feature maps along each dimensional axis in a plurality of dimensional axes with the plurality count equal to the pre-defined dimensional count, following a pre-defined sequential order for the plurality of dimensional axes, in each intermediate step arriving at a plurality of intermediate interleave-concatenated multi-dimensional sub-output feature maps, and in the end arriving at the multi-dimensional output feature map.

5. The method of claim 3, wherein the pre-defined dimensional count is 2 and the plurality of pre-defined common padding parameters comprise a pre-defined common horizontal padding parameter and a predefined common vertical padding parameter; and wherein the one or more hardware accelerators comprises one of the following circuitries:

application specific integrated circuits (ASICs), digital signal processors (DSPs), digital signal processing devices (DSPDs), programmable logic devices (PLDs), field programmable gate arrays (FPGAs), controllers, micro-controllers, or microprocessors.

6. The method of claim 5, wherein the virtual padding configuration comprises:

to left and right sides of the 2-dimensional sub-kernel, a horizontal padding size equal to the result of subtracting first the number one and then the pre-defined common horizontal padding parameter from a horizontal dimensional measurement of the 2-dimensional sub-kernel; and to top and bottom sides of the 2-dimensional sub-kernel, a vertical padding size equal to the result of subtracting first the number one and then the pre-defined common vertical padding parameter from a vertical dimensional measurement of the 2-dimensional sub-kernel.

7. The method of claim 5, wherein the virtual padding configuration comprises:

to the left side of the 2-dimensional sub-kernel, a horizontal padding size equal to the result of subtracting first the number one and then an integral division result of dividing the pre-defined common horizontal padding parameter by 2 from the horizontal dimensional measurement of the 2-dimensional sub-kernel, further reduced by a remainder of dividing the pre-defined common horizontal padding parameter by 2 if and only if the relative position of the 2-dimensional sub-kernel with reference to the 2-dimensional kernel is top-left or bottom-left;

to the right side of the 2-dimensional sub-kernel, a horizontal padding size equal to the result of subtracting first the number one and then an integral division result of dividing the pre-defined common horizontal padding parameter by 2 from the horizontal dimensional measurement of the 2-dimensional sub-kernel, further reduced by a remainder of dividing the pre-defined common horizontal padding parameter by 2 if and only if the relative position of the 2-dimensional sub-kernel with reference to the 2-dimensional kernel is top-right or bottom-right;

to the top side of the 2-dimensional sub-kernel, a vertical padding size equal to the result of subtracting first the number one and then an integral division result of dividing the pre-defined common vertical padding parameter by 2 from the vertical dimensional measurement of the 2-dimensional sub-kernel, further reduced by a remainder of dividing the pre-defined common vertical padding parameter by 2 if and only if the relative position of the 2-dimensional sub-kernel with reference to the 2-dimensional kernel is top-left or top-right; and to the bottom side of the 2-dimensional sub-kernel, a vertical padding size equal to the result of subtracting first the number one and then an integral division result of dividing the pre-defined common vertical padding parameter by 2 from the vertical dimensional measurement of the 2-dimensional sub-kernel, further reduced by a remainder of dividing the pre-defined common vertical padding parameter by 2 if and only if the relative position of the 2-dimensional sub-kernel with reference to the 2-dimensional kernel is bottom-left or bottom-right.

8. A computing device comprising:

one or more processors;

a non-transitory storage coupled to the one or more processors; and a plurality of programs stored in the non-transitory storage that, when executed by the one or more processors, cause the computing device to perform a deconvolution operation between a multi-dimensional kernel in a pre-defined dimensional count and a multi-dimensional input map in the pre-defined dimensional count to obtain a multi-dimensional output feature map in the pre-defined dimensional count, comprising:

subsampling, by one or more hardware accelerators based on a deep neural network, the multi-dimensional kernel into a plurality of non-overlapping multi-dimensional sub-kernels, each in the pre-defined dimensional count, based on a pre-defined common stride parameter, wherein the multi-dimensional kernel comprises four sides, the plurality of multi-dimensional sub-kernels are positioned at different internal locations of the multi-dimensional kernel such that each multi-dimensional sub-kernel is located proximate to a respective pair of adjacent sides among the four sides of the multi-dimensional kernel;

obtaining, by the one or more hardware accelerators based on the deep neural network, a plurality of multi-dimensional sub-output feature maps in the pre-defined dimensional count, wherein the deep neural network comprises a deconvolution layer that deconvolves the multi-dimensional input map with each multi-dimensional sub-kernel in the plurality of non-overlapping multi-dimensional sub-kernels to obtain the plurality of multi-dimensional sub-output feature maps; and in response to determining the pre-defined common stride parameter is not greater than two, using a pre-defined multi-dimensional interleave-concatenation method to interleave-concatenate and reorder, by the one or more hardware accelerators based on the deep neural network, the plurality of multi-dimensional sub-output feature maps into the multi-dimensional output feature map; and wherein the deconvolution operation further comprises:

before the multi-dimensional input map is deconvolved with each multi-dimensional sub-kernel, virtually padding, by the one or more hardware accelerators based on the deep neural network, two adjacent input map sides of the multi-dimensional input map for each multi-dimensional sub-kernel based on each multi-dimensional sub-kernel's internal location of the multi-dimensional kernel, wherein the two adjacent input map sides are associated with a corresponding pair of adjacent sides of the multi-dimensional kernel.

9. The computer device of claim 8, further comprising:

in response to determining the pre-defined common stride parameter is greater than two, using the pre-defined multi-dimensional interleave-concatenation method to interleave-concatenate and reorder the plurality of multi-dimensional sub-output feature maps into a multi-dimensional intermediate output feature map in the pre-defined dimensional count, and then cropping the multi-dimensional intermediate output feature map into the multi-dimensional output feature map.

10. The computer device of claim 8, wherein the stride-dependent virtual padded deconvolution operation between the multi-dimensional input map and a multi-dimensional sub-kernel comprises:

deriving a virtual padding configuration for the multi-dimensional sub-kernel based on the pre-defined common stride parameter, a plurality of pre-defined common padding parameters with the plurality count equal to the pre-defined dimensional count, a plurality of dimensional measurements of the multi-dimensional sub-kernel, and a relative position of the multi-dimensional sub-kernel with reference to the multi-dimensional kernel; and applying a pre-defined deconvolution operation between the multi-dimensional input map on one hand, and a virtual multi-dimensional sub-kernel in the pre-defined dimensional count, equivalent to the result of padding the multi-dimensional sub-kernel in accordance with the virtual padding configuration, on the other hand.

11. The computer device of claim 8, wherein the pre-defined multi-dimensional interleave-concatenation method comprises sequentially interleave-concatenating and reordering the plurality of multi-dimensional sub-output feature maps along each dimensional axis in a plurality of dimensional axes with the plurality count equal to the pre-defined dimensional count, following a pre-defined sequential order for the plurality of dimensional axes, in each intermediate step arriving at a plurality of intermediate interleave-concatenated multi-dimensional sub-output feature maps, and in the end arriving at the multi-dimensional output feature map.

12. The computer device of claim 10, wherein the pre-defined dimensional count is 2 and the plurality of pre-defined common padding parameters comprise a pre-defined common horizontal padding parameter and a predefined common vertical padding parameter; and wherein the one or more hardware accelerators comprises one of the following circuitries:

application specific integrated circuits (ASICs), digital signal processors (DSPs), digital signal processing devices (DSPDs), programmable logic devices (PLDs), field programmable gate arrays (FPGAs), controllers, micro-controllers, or microprocessors.

13. The computer device of claim 12, wherein the virtual padding configuration comprises:

to left and right sides of the 2-dimensional sub-kernel, a horizontal padding size equal to the result of subtracting first the number one and then the pre-defined common horizontal padding parameter from a horizontal dimensional measurement of the 2-dimensional sub-kernel; and to top and bottom sides of the 2-dimensional sub-kernel, a vertical padding size equal to the result of subtracting first the number one and then the pre-defined common vertical padding parameter from a vertical dimensional measurement of the 2-dimensional sub-kernel.

14. The computer device of claim 12, wherein the virtual padding configuration comprises:

to the left side of the 2-dimensional sub-kernel, a horizontal padding size equal to the result of subtracting first the number one and then an integral division result of dividing the pre-defined common horizontal padding parameter by 2 from the horizontal dimensional measurement of the 2-dimensional sub-kernel, further reduced by a remainder of dividing the pre-defined common horizontal padding parameter by 2 if and only if the relative position of the 2-dimensional sub-kernel with reference to the 2-dimensional kernel is top-left or bottom-left;

to the right side of the 2-dimensional sub-kernel, a horizontal padding size equal to the result of subtracting first the number one and then an integral division result of dividing the pre-defined common horizontal padding parameter by 2 from the horizontal dimensional measurement of the 2-dimensional sub-kernel, further reduced by a remainder of dividing the pre-defined common horizontal padding parameter by 2 if and only if the relative position of the 2-dimensional sub-kernel with reference to the 2-dimensional kernel is top-right or bottom-right;

to the top side of the 2-dimensional sub-kernel, a vertical padding size equal to the result of subtracting first the number one and then an integral division result of dividing the pre-defined common vertical padding parameter by 2 from the vertical dimensional measurement of the 2-dimensional sub-kernel, further reduced by a remainder of dividing the pre-defined common vertical padding parameter by 2 if and only if the relative position of the 2-dimensional sub-kernel with reference to the 2-dimensional kernel is top-left or top-right; and to the bottom side of the 2-dimensional sub-kernel, a vertical padding size equal to the result of subtracting first the number one and then an integral division result of dividing the pre-defined common vertical padding parameter by 2 from the vertical dimensional measurement of the 2-dimensional sub-kernel, further reduced by a remainder of dividing the pre-defined common vertical padding parameter by 2 if and only if the relative position of the 2-dimensional sub-kernel with reference to the 2-dimensional kernel is bottom-left or bottom-right.

15. A non-transitory computer readable storage medium storing a plurality of programs for execution by a computing device having one or more processors, wherein the plurality of programs, when executed by the one or more processors, cause the computing device to perform a deconvolution operation between a multi-dimensional kernel in a pre-defined dimensional count and a multi-dimensional input map in the pre-defined dimensional count to obtain a multi-dimensional output feature map in the pre-defined dimensional count, comprising:

subsampling, by one or more hardware accelerators based on a deep neural network, the multi-dimensional kernel into a plurality of non-overlapping multi-dimensional sub-kernels, each in the pre-defined dimensional count, based on a pre-defined common stride parameter, wherein the multi-dimensional kernel comprises four sides, the plurality of multi-dimensional sub-kernels are positioned at different internal locations of the multi-dimensional kernel such that each multi-dimensional sub-kernel is located proximate to a respective pair of adjacent sides among the four sides of the multi-dimensional kernel;

obtaining, by the one or more hardware accelerators based on the deep neural network, a plurality of multi-dimensional sub-output feature maps in the pre-defined dimensional count, wherein the deep neural network comprises a deconvolution layer that deconvolves the multi-dimensional input map with each multi-dimensional sub-kernel in the plurality of non-overlapping multi-dimensional sub-kernels to obtain the plurality of multi-dimensional sub-output feature maps; and in response to determining the pre-defined common stride parameter is not greater than two, using a pre-defined multi-dimensional interleave-concatenation method to interleave-concatenate and reorder, by the one or more hardware accelerators based on the deep neural network, the plurality of multi-dimensional sub-output feature maps into the multi-dimensional output feature map; and wherein the deconvolution operation further comprises:
before the multi-dimensional input map is deconvolved with each multi-dimensional sub-kernel, virtually padding, by the one or more hardware accelerators based on the deep neural network, two adjacent input map sides of the multi-dimensional input map for each multi-dimensional sub-kernel based on each multi-dimensional sub-kernel's internal location of the multi-dimensional kernel, wherein the two adjacent input map sides are associated with a corresponding pair of adjacent sides of the multi-dimensional kernel.

16. The non-transitory computer readable storage medium of claim 15, further comprising:
in response to determining the pre-defined common stride parameter is greater than two, using the pre-defined multi-dimensional interleave-concatenation method to interleave-concatenate and reorder the plurality of multi-dimensional sub-output feature maps into a multi-dimensional intermediate output feature map in the pre-defined dimensional count, and then cropping the multi-dimensional intermediate output feature map into the multi-dimensional output feature map.

17. The non-transitory computer readable storage medium of claim 15, wherein the stride-dependent virtual padded deconvolution operation between the multi-dimensional input map and a multi-dimensional sub-kernel comprises:
deriving a virtual padding configuration for the multi-dimensional sub-kernel based on the pre-defined common stride parameter, a plurality of pre-defined common padding parameters with the plurality count equal to the pre-defined dimensional count, a plurality of dimensional measurements of the multi-dimensional sub-kernel, and a relative position of the multi-dimensional sub-kernel with reference to the multi-dimensional kernel; and
applying a pre-defined deconvolution operation between the multi-dimensional input map on one hand, and a virtual multi-dimensional sub-kernel in the pre-defined dimensional count, equivalent to the result of padding the multi-dimensional sub-kernel in accordance with the virtual padding configuration, on the other hand.

18. The non-transitory computer readable storage medium of claim 15, wherein the pre-defined multi-dimensional interleave-concatenation method comprises sequentially interleave-concatenating and reordering the plurality of multi-dimensional sub-output feature maps along each dimensional axis in a plurality of dimensional axes with the plurality count equal to the pre-defined dimensional count, following a pre-defined sequential order for the plurality of dimensional axes, in each intermediate step arriving at a plurality of intermediate interleave-concatenated multi-dimensional sub-output feature maps, and in the end arriving at the multi-dimensional output feature map.

19. The non-transitory computer readable storage medium of claim 17, wherein the pre-defined dimensional count is 2 and the plurality of pre-defined common padding parameters comprise a pre-defined common horizontal padding parameter and a predefined common vertical padding parameter; and
wherein the one or more hardware accelerators comprises one of the following circuitries:
application specific integrated circuits (ASICs), digital signal processors (DSPs), digital signal processing devices (DSPDs), programmable logic devices (PLDs), field programmable gate arrays (FPGAs), controllers, micro-controllers, or microprocessors.

20. The non-transitory computer readable storage medium of claim 19, wherein the virtual padding configuration comprises:
to left and right sides of the 2-dimensional sub-kernel, a horizontal padding size equal to the result of subtracting first the number one and then the pre-defined common horizontal padding parameter from a horizontal dimensional measurement of the 2-dimensional sub-kernel; and
to top and bottom sides of the 2-dimensional sub-kernel, a vertical padding size equal to the result of subtracting first the number one and then the pre-defined common vertical padding parameter from a vertical dimensional measurement of the 2-dimensional sub-kernel.

21. The non-transitory computer readable storage medium of claim 19, wherein the virtual padding configuration comprises:
to the left side of the 2-dimensional sub-kernel, a horizontal padding size equal to the result of subtracting first the number one and then an integral division result of dividing the pre-defined common horizontal padding parameter by 2 from the horizontal dimensional measurement of the 2-dimensional sub-kernel, further reduced by a remainder of dividing the pre-defined common horizontal padding parameter by 2 if and only if the relative position of the 2-dimensional sub-kernel with reference to the 2-dimensional kernel is top-left or bottom-left;
to the right side of the 2-dimensional sub-kernel, a horizontal padding size equal to the result of subtracting first the number one and then an integral division result of dividing the pre-defined common horizontal padding parameter by 2 from the horizontal dimensional measurement of the 2-dimensional sub-kernel, further reduced by a remainder of dividing the pre-defined common horizontal padding parameter by 2 if and only if the relative position of the 2-dimensional sub-kernel with reference to the 2-dimensional kernel is top-right or bottom-right;
to the top side of the 2-dimensional sub-kernel, a vertical padding size equal to the result of subtracting first the number one and then an integral division result of dividing the pre-defined common vertical padding parameter by 2 from the vertical dimensional measurement of the 2-dimensional sub-kernel, further reduced by a remainder of dividing the pre-defined common vertical padding parameter by 2 if and only if the relative position of the 2-dimensional sub-kernel with reference to the 2-dimensional kernel is top-left or top-right; and to the bottom side of the 2-dimensional sub-kernel, a vertical padding size equal to the result of subtracting first the number one and then an integral division result of dividing the pre-defined common vertical padding parameter by 2 from the vertical dimensional measurement of the 2-dimensional sub-kernel, further reduced by a remainder of dividing the pre-defined common vertical padding parameter by 2 if and only if the relative position of the 2-dimensional sub-kernel with reference to the 2-dimensional kernel is bottom-left or bottom-right.

* * * * *